(12) United States Patent
Ito et al.

(10) Patent No.: US 12,541,173 B2
(45) Date of Patent: Feb. 3, 2026

(54) IMAGE FORMING APPARATUS HAVING A FILTER TO REDUCE DUST

(71) Applicant: CANON KABUSHIKI KAISHA, Tokyo (JP)

(72) Inventors: Shingo Ito, Tokyo (JP); Ai Suzuki, Tokyo (JP); Toshiyuki Watanabe, Kanagawa (JP); Osamu Sasaoka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/883,058

(22) Filed: Sep. 12, 2024

(65) Prior Publication Data

US 2025/0093813 A1    Mar. 20, 2025

(30) Foreign Application Priority Data

Sep. 15, 2023   (JP) ................... 2023-149817

(51) Int. Cl.
| | |
|---|---|
| *G03G 15/00* | (2006.01) |
| *B01D 39/12* | (2006.01) |
| *B01D 39/16* | (2006.01) |
| *G03G 21/20* | (2006.01) |

(52) U.S. Cl.
CPC ............ *G03G 21/20* (2013.01); *B01D 39/12* (2013.01); *B01D 39/1676* (2013.01); *G03G 15/751* (2013.01); *G03G 21/206* (2013.01)

(58) Field of Classification Search
CPC .... G03G 15/751; G03G 21/20; G03G 21/206; B01D 39/12; B01D 39/1676
See application file for complete search history.

(56) References Cited

U.S. PATENT DOCUMENTS

| | | | | |
|---|---|---|---|---|
| 10,185,263 | B2* | 1/2019 | Hayashi | G03G 21/206 |
| 11,106,177 | B1* | 8/2021 | Nomura | G03G 21/206 |
| 2009/0257767 | A1* | 10/2009 | Funabiki | G03G 15/206 399/68 |
| 2021/0311418 | A1* | 10/2021 | Omata | G03G 15/1675 |
| 2023/0288825 | A1* | 9/2023 | Yamashita | G03G 15/75 |
| 2024/0427279 | A1* | 12/2024 | Katagiri | G03G 15/751 |

FOREIGN PATENT DOCUMENTS

| | | |
|---|---|---|
| JP | H09281825 A | 10/1997 |
| JP | 2003162165 A | 6/2003 |
| JP | 2017198870 A | 11/2017 |

* cited by examiner

*Primary Examiner* — Sophia S Chen
(74) *Attorney, Agent, or Firm* — ROSSI, KIMMS & McDOWELL LLP

(57) ABSTRACT

An image forming apparatus includes an image forming portion, a fixing portion, a housing configured to accommodate the image forming portion and the fixing portion and having an opening portion through which an outside of the housing and an inside of the housing communicate with each other. A photosensitive member includes a conductive base body and a surface layer portion formed on an outer periphery of the base body. In a case where a thickness of the surface layer portion is a distance from an outer peripheral surface of the base body to a surface of the photosensitive member, a maximum particle diameter of particles capable of passing through the filter is smaller than the thickness of the surface layer portion.

16 Claims, 11 Drawing Sheets

IMAGE FORMING APPARATUS HAVING A FILTER TO REDUCE DUST

BACKGROUND OF THE INVENTION

Field of the Invention

The present invention relates to an image forming apparatus that forms an image on a recording material.

Description of the Related Art

Japanese Patent Application Laid-Open No. 119-281825 discloses providing an opening portion (discharge port) for discharging water vapor generated in a fixing portion to the outside of the apparatus in a top cover of an image forming apparatus.

There is a possibility that dust having entered the inside of the apparatus through the opening portion provided in the housing of the image forming apparatus causes a problem such as an image defect or breakage of a film of the fixing portion or an intermediate transfer belt.

SUMMARY OF THE INVENTION

The present invention provides an image forming apparatus that can reduce troubles caused by dust.

According to an aspect of the invention, an image forming apparatus includes an image forming portion including a photosensitive member and configured to form a toner image on a recording material by using the photosensitive member, a fixing portion configured to form a nip portion to nip the recording material, and configured to fix the toner image to the recording material by heating the toner image while conveying the recording material with the nip portion, a housing configured to accommodate the image forming portion and the fixing portion and having an opening portion through which an outside of the housing and an inside of the housing communicate with each other, the opening portion being positioned above the nip portion in a vertical direction, and a filter covering the opening portion, wherein the photosensitive member includes a conductive base body and a surface layer portion formed on an outer periphery of the base body, and wherein in a case where a thickness of the surface layer portion is a distance from an outer peripheral surface of the base body to a surface of the photosensitive member, a maximum particle diameter of particles capable of passing through the filter is smaller than the thickness of the surface layer portion.

According to another aspect of the invention, an image forming apparatus includes an image forming portion configured to form a toner image on a recording material, a fixing portion including a tubular film and a heating portion configured to heat the film, configured to form a nip portion to nip the recording material, and configured to fix the toner image to the recording material by heating the toner image with the film, a housing configured to accommodate the image forming portion and the fixing portion and having an opening portion through which an outside of the housing and an inside of the housing communicate with each other, the opening portion being positioned above the nip portion in a vertical direction, and a filter covering the opening portion, wherein a maximum particle diameter of particles capable of passing through the filter is smaller than a thickness of the film.

According to another aspect of the invention, an image forming apparatus includes an image forming portion including a photosensitive member and an intermediate transfer belt and configured to transfer a toner image formed on the photosensitive member onto the intermediate transfer belt through primary transfer and then transfer the toner image from the intermediate transfer belt onto a recording material through secondary transfer, a fixing portion configured to form a nip portion to nip the recording material, and configured to fix the toner image to the recording material by heating the toner image while conveying the recording material with the nip portion, a housing configured to accommodate the image forming portion and the fixing portion and having an opening portion through which an outside of the housing and an inside of the housing communicate with each other, the opening portion being positioned above the nip portion in a vertical direction, and a filter covering the opening portion, wherein the intermediate transfer belt includes a base layer and a surface layer formed on an outer periphery of the base layer, the surface layer being configured to bear the toner image, and wherein a maximum particle diameter of particles capable of passing through the filter is smaller than a thickness of the surface layer.

According to another aspect of the invention, an image forming apparatus includes an image forming portion including a photosensitive member and configured to form a toner image on a recording material by using the photosensitive member, a fixing portion configured to form a nip portion to nip the recording material, and configured to fix the toner image to the recording material by heating the toner image while conveying the recording material with the nip portion, a housing configured to accommodate the image forming portion and the fixing portion and having an opening portion through which an outside of the housing and an inside of the housing communicate with each other, the opening portion being positioned above the nip portion in a vertical direction, and a filter covering the opening portion, wherein the photosensitive member includes a conductive base body and a surface layer portion formed on an outer periphery of the base body, and wherein the filter is formed from a plastic foam of an open cell type, and wherein $\alpha/(\beta/\gamma)<\delta$ is satisfied in a case where $\alpha$ (μm) represents an average value of cell diameters of the plastic foam in a plane orthogonal to a thickness direction of the filter, $\beta$ (μm) represents a thickness of the filter, $\gamma$ (μm) represents an average value of cell diameters of the plastic foam in the thickness direction of the filter, and $\delta$ (μm) represents a distance from an outer peripheral surface of the base body to a surface of the photosensitive member.

Further features of the present invention will become apparent from the following description of exemplary embodiments with reference to the attached drawings.

DESCRIPTION OF THE EMBODIMENTS

Embodiments of the present disclosure will be described below with reference to drawings.

Example 1

In the present example, a configuration example of an image forming apparatus will be described by taking an image forming apparatus 100 illustrated in FIG. 1A as an example. The image forming apparatus 100 is a monochromatic laser printer that forms a monochromatic image by an electrophotographic system, and forms an image (toner image) on a recording material P by using toner as a developer in accordance with image information transmitted thereto from an external device such as a personal computer. As the recording material P (recording medium), various sheet materials of different materials can be used. Examples of the various sheet materials include paper sheets such as plain paper sheets and cardboards, sheets of irregular shapes such as envelopes and index paper sheets, and cloths.

In the description below, an up-down direction (vertical direction, direction following the gravity direction) of the image forming apparatus 100 in the case where the image forming apparatus 100 is disposed on a horizontal surface will be referred to as a Z-axis direction. The direction of a rotational axis of a photosensitive drum 1 will be referred to as an X-axis direction. A direction intersecting with both the X-axis direction and the Z-axis direction will be referred to as a Y-axis direction. The X-axis direction, the Y-axis direction, and the Z-axis direction are preferably orthogonal to each other. In the X-axis direction, the positive side (+X side) will be referred to as the right side, and the negative side (−X side) will be referred to as the left side. In the Y-axis direction, the positive side (+Y side) will be referred to as the front side or front surface side, and the negative side (−Y side) will be referred to as the rear side or rear surface side. In the Z-axis direction, the positive side (+Z side) will be referred to as the upper side, and the negative side (−Z side) will be referred to as the lower side.

In the present example, the X-axis direction is the width direction of the recording material P orthogonal to both the vertical direction and a discharge direction Dc of the recording material P.

Image Forming Apparatus

Figure 1A:
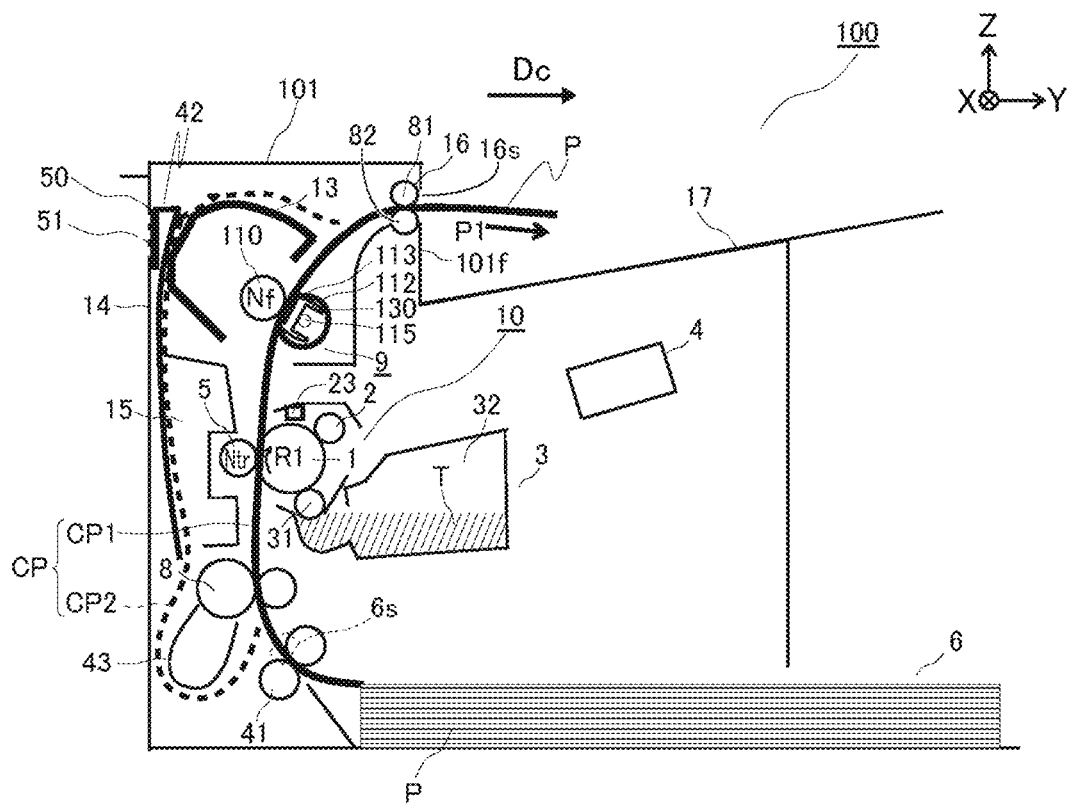
FIG. 1A is a schematic view of an image forming apparatus according to an example.
Figure 2:
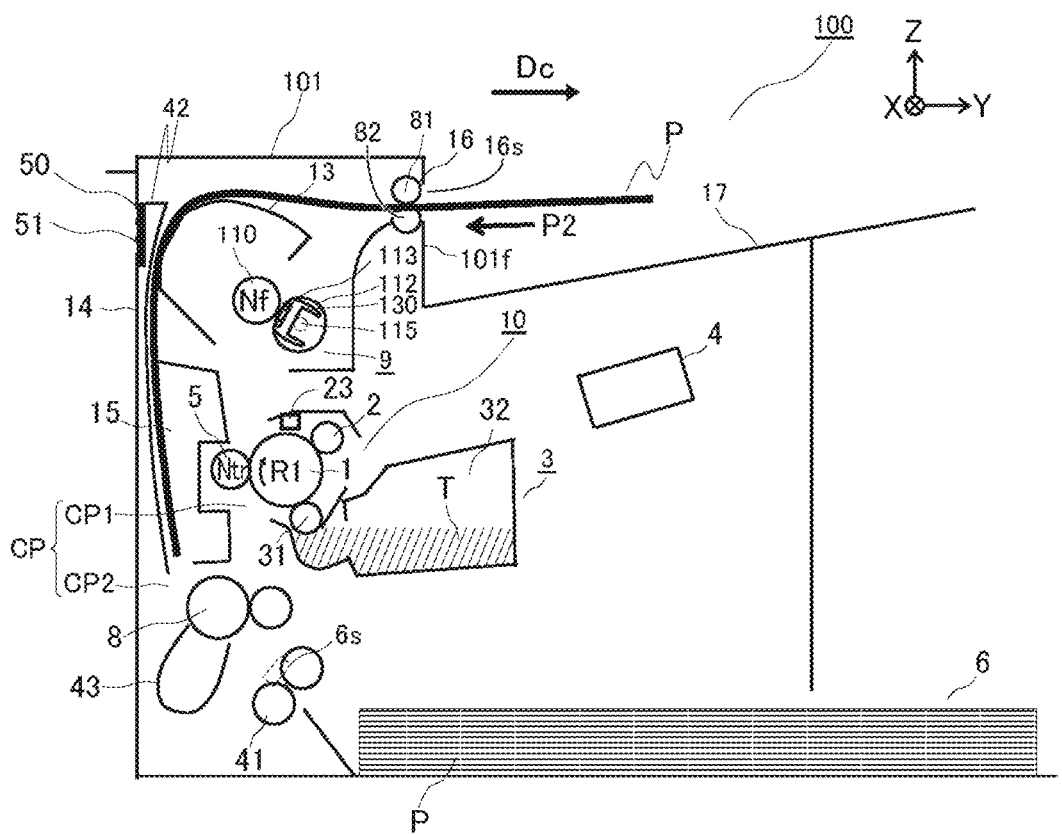
FIG. 2 is a schematic view of the image forming apparatus according to the example.

FIGS. 1A and 2 are schematic views illustrating a cross-section of the image forming apparatus 100 according to Example 1.

As illustrated in FIGS. 1A and 2, the image forming apparatus 100 includes a feeding portion 6, a registration roller pair 8, an image forming portion 10, a fixing portion 9, and a discharge portion 16. In addition, the image forming apparatus 100 includes a housing 101 that accommodates the feeding portion 6, the registration roller pair 8, the image forming portion 10, the fixing portion 9, and the discharge portion 16.

The feeding portion 6 includes a stacking portion (cassette, tray) which is attachable to and detachable from the housing 101 and on which recording materials P are stacked, and a roller pair 41 that feeds the recording materials P one by one from the stacking portion. The registration roller pair 8 conveys the recording material P fed by the feeding portion 6 to a transfer nip Ntr at a timing matching toner image formation in the image forming portion 10. The image forming portion 10 forms a toner image by executing an electrophotographic process, transfers the toner image onto the recording material P in the transfer nip Ntr, and thus forms an image on the recording material P. The fixing portion 9 forms a fixing nip Nf serving as a nip portion to nip the recording material P, and fixes the toner image to the recording material P by heating the toner image in the fixing nip Nf while conveying the recording material P. The discharge portion 16 discharges the recording material P on which an image has been formed to the outside of the image forming apparatus 100 (outside of the housing 101, outside the housing) in a discharge direction Dc intersecting with the vertical direction (Z-axis direction).

An arrow P1 of FIG. 1A indicates a conveyance path of the recording material P in the case of performing simplex printing (one-side image formation) in which the image forming apparatus 100 forms an image on only one surface (first surface) of the recording material P To be noted, the recording material P is also conveyed along the path of the arrow P1 when forming an image on the first surface in the case where the image forming apparatus 100 performs duplex printing (two-side image formation) of forming an image on each of the first surface and a second surface opposite thereto of the recording material P. An arrow P2 of FIG. 2 indicates a conveyance path in which the recording material P on the first surface of which image formation has been completed is conveyed toward the image forming portion 10 again in the case where the image forming apparatus 100 performs duplex printing.

A series of operations in which the image forming apparatus 100 performs simplex printing or duplex printing while conveying one recording material P and discharges the recording material P to the outside of the image forming apparatus 100 will be referred to as an image forming operation or a sheet passing operation. An operation in which the image forming apparatus 100 successively performs the image forming operation (sheet passing operation) on a plurality of recording materials P will be referred to as successive sheet-passing. The accumulated sheet number of the recording material P representing the number of the recording materials P on which the image forming apparatus 100 has performed the image forming operation since the image forming apparatus 100 has been shipped from the factory or since the image forming apparatus 100 has been initialized after being shipped will be referred to as an accumulated sheet-passing number.

A recording material (recording material of a maximum size) having the largest width in the X-axis direction (width direction) among recording materials on which the image forming apparatus 100 can form an image in the present example is a recording material of an LTR (letter) size (width: 215.9 mm). In addition, a maximum printing width that is the width of a region (effective printing region) in which the image forming portion 10 can form an image on the recording material of the LTR size is 206 mm. A recording material (recording material of a minimum size) having the smallest width in the X-axis direction (width direction) among recording materials on which the image forming apparatus 100 can form an image in the present example is a recording material of a width of 98.4 mm. In other words, in the present example, the maximum sheet passing width of the image forming apparatus 100 is 215.9 mm, and the minimum sheet passing width is 98.4 mm.

That is, in the present example, a passing region of the recording material of the maximum size having the largest length in the X-axis direction (width direction) among the recording materials on which the image forming apparatus can form an image, in the width direction orthogonal to both the vertical direction and the discharge direction, is a region of a width of 215.9 mm. In addition, in the present example, a passing region of the recording material of the minimum size in the width direction is a region of a width of 98.4 mm. In the present example, the passing region of the recording material extends symmetrically with respect to the center of a conveyance path CP in the X-axis direction (width direction). The center of the conveyance path CP refers to the center of a space that the recording material P can pass through, and may be a center position in the X-axis direction between two rubber roller portions 81a positioned at two ends of the discharge driving roller 81 illustrated in FIG. 4A. In addition, in the case where positioning portions that position the two end portions of the recording material P in the X-axis direction are provided on the stacking portion of the feeding portion 6, the center of the conveyance path CP may be a center position between the positioning portions of the two ends in the X-axis direction.

The housing 101 includes a frame body of the image forming apparatus 100 and an exterior member (cover member or a door member) serving as an exterior surface of the image forming apparatus 100. A back door 14 and a discharge tray 17 that will be described later are each an example of the exterior member. A space that is on the outside with respect to the outer surface of the housing 101 will be referred to as the outside of the image forming apparatus 100 or the outside of the apparatus, and a space that is on the inside with respect to the outer surface of the housing 101 will be referred to as the inside of the image forming apparatus 100 or the inside of the apparatus. On the inside of the image forming apparatus 100, the conveyance path CP serving as a passage space that the recording material P passes through is provided.

The housing 101 of the present example is provided with an inlet port 6s, a discharge port 16s, and a ventilating portion 51. The inlet port 6s, the discharge port 16s, and the ventilating portion 51 are each an opening portion including an opening through which the inside of the image forming apparatus 100 communicates with the outside of the image forming apparatus 100. More specifically, the inlet port 6s, the discharge port 16s, and the ventilating portion 51 are each an opening portion through which the conveyance path CP communicates with the outside of the image forming apparatus 100. The inlet port 6s is an opening portion (feeding port) through which the recording material P fed by the feeding portion 6 is received. The discharge port 16s is an opening portion through which the recording material P discharged by the discharge portion 16 passes. The ventilating portion 51 will be described later.

In the present example, the inlet port 6s and the discharge port 16s are each one opening, and the ventilating portion 51 includes a plurality of openings (plurality of vent holes 51a that will be described later). A plurality of inlet ports 6s and/or a plurality of discharge ports 16s may be provided.

The ventilating portion 51 may be configured to include only one opening. In addition, the housing 101 may have an opening different from those described above.

The conveyance path Cp includes a main conveyance path CP1 and a duplex conveyance path CP2. The main conveyance path CP1 is a conveyance path extending from the inlet port 6s to the discharge port 16s via the transfer nip Ntr and the fixing nip Nf. The duplex conveyance path CP2 is a conveyance path branching from the main conveyance path CP1 at a position between the fixing portion 9 and the discharge portion 16 in a recording material conveyance direction in the main conveyance path CP1 and merging with the main conveyance path CP1 at a position between the roller pair 41 of the feeding portion 6 and the registration roller pair 8.

In other words, the conveyance path CP includes the main conveyance path CP1 serving as a first conveyance path that the recording material P passes through when the image forming portion 10 forms an image thereon. In addition, the conveyance path CP includes the duplex conveyance path CP2 serving as a second conveyance path which branches from the first conveyance path and through which the recording material on a first surface of which a toner image has been formed by the image forming portion 10 is conveyed toward the image forming portion 10 again in the case of forming an image on a second surface of the recording material opposite to the first surface.

The image forming portion 10 includes a photosensitive drum 1 serving as an image bearing member, a charging roller 2 serving as a charging portion, a scanner unit 4 serving as an exposing portion, a developing unit 3 serving as a developing portion, a transfer roller 5 serving as a transfer unit, and a pre-exposing unit 23. The developing unit 3 includes a toner container 32 accommodating toner T serving as a developer, and a developing roller 31 that bears the toner in the toner container 32 and thus supplies the toner to the photosensitive drum 1. The transfer nip Ntr serving as a transfer portion where transfer of the image is performed is formed between the photosensitive drum 1 and the transfer roller 5.

Part or the entirety of the image forming portion 10 may be a cartridge attachable to and detachable from the housing 101. In this case, for example, the housing 101 may include a cover member openably and closably provided on the front surface or the upper surface thereof, and the attachment and detachment of the cartridge may be allowed by opening the cover member.

The photosensitive drum 1 is a photosensitive member formed in a cylindrical shape (drum shape). A layer configuration of the photosensitive drum 1 of the present example will be described below.

The photosensitive drum 1 is rotationally driven at a predetermined peripheral speed in an arrow R1 direction about the rotational axis thereof by an unillustrated drive source. The peripheral speed of the photosensitive drum 1 defines the speed of the image formation by the image forming apparatus 100, and is also referred to as a process speed. The process speed of the present example is, for example, 140 mm/sec.

The charging roller 2 comes into contact with the photosensitive drum 1 at a predetermined contact pressure and thus forms a charging portion. In the present example, the contact portion (nip portion) between the charging roller 2 and the photosensitive drum 1 in the rotational direction of the photosensitive drum 1 is about 1 mm. The charging roller 2 includes a conductive base body. The charging roller 2 uniformly charges the surface of the photosensitive drum 1 to a predetermined potential as a result of a predetermined charging voltage being applied to the conductive base body by a charging power source. In the present example, the photosensitive drum 1 is negatively charged by the charging roller 2.

The charging roller 2 used in the present example includes a core metal having a diameter of 5 mm serving as a conductive base body, a base layer formed from hydrin rubber, and a surface layer formed from urethane, and is formed to have an outer diameter of 9.7 mm. In addition, the resistance of the charging roller 2 is $1 \times 10^6$ $\Omega$ or less, and the hardness thereof is 70° as measured by an MD-1 rubber hardness meter. To be noted, although a direct current voltage is used as the charging voltage in the present example, the configuration is not limited to this, and the charging voltage may be a voltage in which an alternate current voltage is superimposed on a direct current voltage.

The core metal is provided with a gear, and as a result of the gear engaging with a gear of the photosensitive drum 1, the charging roller 2 rotates at a constant speed with respect to the photosensitive drum 1. In the present example, the gear ratio and the like are set such that the peripheral speed ratio between the charging roller 2 and the photosensitive drum 1 in image formation is about 107%. The peripheral speed ratio between the charging roller 2 and the photosensitive drum 1 is, the ratio of the surface speed of the charging roller 2 to the surface speed of the photosensitive drum 1. In the charging portion, as a result of the speed difference between the charging roller 2 and the photosensitive drum 1, the toner attached to the charging roller 2 is likely to return to the photosensitive drum 1 by frictional charging.

In the present example, pressurizing springs that pressurize the charging roller 2 against the photosensitive drum 1 are used. The pressurizing spring press bearings supporting core metal portions at two ends of the charging roller 2 in a direction perpendicular to the surface of the photosensitive drum 1 in the charging portion. In the direction of the rotational axis of the photosensitive drum 1 (X-axis direction), the pressing force on the side on which a gear of the charging roller 2 is disposed, that is, the pressing force on the driving side is 7.5 N, and the pressing force on the opposite side to the gear, that is, the pressing force on the non-driving side is 5.6 N.

To cause stable electrical discharge at the charging portion, the pre-exposing unit 23 irradiates a region after passing the transfer nip Ntr and before reaching the charging portion with light in the surface of the photosensitive drum 1 to remove remaining charges.

The scanner unit 4 irradiates the photosensitive drum 1 with laser light corresponding to the image information input from the external device by using a polygonal mirror, and thus exposes the surface of the photosensitive drum 1 in a scanning manner. An electrostatic latent image corresponding to the image information is formed on the exposed surface of the photosensitive drum 1.

The developing unit 3 supplies the toner T to the photosensitive drum 1, and thus develops the electrostatic latent image into a toner image. In the present example, a contact development method is employed as the development method, and the toner layer borne on the developing roller 31 comes into contact with the photosensitive drum 1 at a developing portion where the photosensitive drum 1 and the developing roller 31 oppose each other. A developing voltage is applied to the developing roller 31 by a developing power source. As a result of an electric field formed at the developing roller 31 by the developing voltage, the toner borne on the developing roller 31 transfers from the developing roller 31 to the drum surface in accordance with the potential distribution on the surface of the photosensitive drum 1. As a result of this, the electrostatic latent image on the photosensitive drum 1 is visualized as a toner image.

Polymer toner formed by a polymerization method can be used as the toner T of the present example. The normal charging polarity (standard polarity) of the toner T is negative. In addition, the toner particle diameter is 6 μm.

The transfer roller 5 abuts the photosensitive drum 1 by a predetermined pressurizing force, and thus the transfer nip Ntr is formed. The transfer roller 5 is rotated by following the rotating photosensitive drum 1 or following the recording material P passing through the transfer nip Ntr. A voltage of a positive polarity is applied to the core metal of the transfer roller 5 from an unillustrated transfer power source. The toner image borne on the photosensitive drum 1 is transferred onto the recording material P at the transfer nip Ntr in accordance with the electric field generated by the voltage application.

The transfer roller 5 used in the present example includes a core metal of a steel rod plated with nickel, and a foam sponge layer mainly formed from nitrile butadiene rubber (NBR) and epichlorohydrin rubber on the outer peripheral surface of the core metal. The diameter of the core metal is 8 mm, and the thickness of the foam sponge layer is 3 mm. In addition, as a result of the bearings holding the two ends of the core metal being urged by the spring members, the transfer roller 5 is in pressure contact with the photosensitive drum 1 by a pressurizing force of 1 kgf (9.8 N).

In the present example, a cleanerless system (drum cleanerless system, simultaneous developing-cleaning system) in which toner (transfer residual toner) remaining on the photosensitive drum 1 without being transferred onto the recording material P at the transfer nip Ntr is collected by the developing unit 3 is employed. The transfer residual toner is charged to the negative polarity at the charging portion by the charging roller 2. The developing voltage is set such that the developing roller 31 is at the positive polarity with respect to the surface potential of a non-image portion of the photosensitive drum 1. Therefore, the transfer residual toner attached to the non-image portion is transferred from the photosensitive drum 1 to the developing roller 31 at the developing portion, and is collected by the developing unit 3. The collected transfer residual toner is agitated with the toner T accommodated in the toner container 32, and is used again for development.

In the drum cleanerless system, a cleaning member that removes transfer residual toner from the photosensitive drum 1 and a waste toner container that accommodates the removed transfer residual toner can be omitted. Therefore, the image forming apparatus can be miniaturized. To be noted, the image forming apparatus 100 may include a cleaning member and a waste toner container in addition to the configuration of the present example instead of the drum cleanerless system.

The fixing portion 9 is a unit (image heating unit) of a thermal fixation system that fixes the toner image to the recording material P by heating the toner image. More specifically, the fixing portion 9 heats and pressurizes the toner image on the recording material P while nipping and conveying, in the fixing nip Nf, the recording material P onto which the toner image has been transferred in the transfer nip Ntr. As a result of this, toner particles melt and then adhere, and thus the toner image is fixed to the recording material P.

The fixing portion 9 of the present example is a unit of a film heating system that is excellent in shortening the time for activation and reducing the power consumption. The fixing portion 9 includes a fixing film 112 serving as a heating member (fixing member), a heater 113 serving as a heating portion, a heater holder 130 that holds the heater 113, and a pressurizing roller 110 serving as a pressurizing member. The fixing film 112 is a tubular (endless) film having flexibility. The heater 113 is held by the heater holder 130, and is disposed in an inner space of the fixing film 112 together with the heater holder 130. The pressurizing roller 110 is disposed such that the fixing film 112 is interposed between the pressurizing roller 110 and the heater 113. A fixing nip Nf is formed as a contact portion (nip portion) between the fixing film 112 and the pressurizing roller 110.

The pressurizing roller 110 is an elastic roller (rubber roller) including a core metal and an elastic layer. As a result of the bearings provided at two ends of the core metal being urged by the pressurizing springs, the pressurizing roller 110 is in pressure contact with the heater 113 with the fixing film 112 therebetween. To be noted, a configuration in which the heater holder 130 (or a support member such as a metal stay that supports the heater holder 130) is urged toward the pressurizing roller 110 by pressurizing springs may be employed.

A driving force is input from a drive source to a drive gear provided at an end portion of the core metal, and thus the pressurizing roller 110 rotates. The fixing film 112 is rotated by following the rotation of the pressurizing roller 110 or following the recording material P passing through the fixing nip Nf.

A typical heater used in a heating unit of a film heating system can be used as the heater 113. For example, the heater 113 is a ceramic heater including a ceramic substrate and a heat generating resistor disposed on a serial circuit on the substrate. Specifically, the heater 113 includes an alumina substrate having a width of 6 mm and a thickness of 1 mm, a Ag/Pd (silver palladium) heat generating resistor having a height of 10 µm applied on the surface of the substrate by screen printing, and a glass layer having a thickness of 50 µm serving as a protective layer formed to cover the heat generating resistor.

As the fixing film 112, a film having a multilayer structure in which different material layers are laminated in the thickness direction can be used. The multilayer structure includes, for example, a base layer that slides on the heater 113, a surface layer that comes into contact with the recording material P, and a conductive primer layer bonding the base layer and the surface layer together. A layer in the surface layer that is on the outermost side is a releasing layer for suppressing surface soiling. The fixing film 112 of the present example has such a peripheral length that the fixing film 112 has an outer diameter of 20 mm when formed into a cylindrical shape.

The base layer requires heat resistance for receiving the heat of the heater 113, and further requires strength for sliding on the heater 113. As the material of the base layer, metal such as stainless used steel (SUS) or nickel, or a heat-resistant resin such as polyimide may be used. The metal is stronger than the resin and thus can be made thinner, and in addition, has higher thermal conductivity and is thus more likely to transmit the heat of the heater 113 to the surface layer. In contrast, the resin has a smaller specific gravity than the metal, and thus has a smaller heat capacity and is more easily heated up. Further, a thin film of resin can be formed by coating, and thus can be formed at a lower cost. In the present example, polyimide resin is used as the material of the base layer of the fixing film 112. In addition, a carbon-based filler is added to the polyimide resin to improve the thermal conductivity and strength. The thinner the base layer is, the higher the heat transmission efficiency of the fixing film 112 is, but sufficient strength may not be obtained if the base layer is too thin. The thickness of the base layer is preferably about 15 µm to about 100 µm, and is set to 60 µm in the present example.

The conductive primer layer is formed from polyimide resin, fluorine resin, or the like, and the resistance thereof is lowered by addition of carbon or the like. It is preferable that the potential of the fixing film 112 during image formation is stabilized by electrically connecting (grounding) an exposed portion of the conductive layer to the ground potential.

As the material of the outermost layer (releasing layer), fluorine resin such as perfluoroalkoxy resin (PFA), polytetrafluoroethylene resin (PTFE), or tetrafluoroethylene-hexafluoropropylene resin (FEP) is preferably used. In the present example, PFA excellent in releasability and heat resistance among the fluorine resins is used, and the resistance value of the PFA is adjusted (to a medium resistance) by dispersing a conductive agent in the substrate of PFA. The releasing layer may be formed by covering the outer peripheral surface of the base layer and the conductive primer layer by a tube, or may be formed by coating the surface of the conductive primer layer by a paint. In the present example, the releasing layer is formed by a coating method with which the releasing layer can be formed thin. The thinner the releasing layer is, the higher the heat transmission efficiency of the fixing film 112 is, but durability of the fixing film 112 can be low if the releasing layer is too thin. The thickness of the releasing layer is preferably about 5 µm to about 30 µm, and is set to 10 µm in the present example.

The pressurizing roller 110 of the present example includes, for example, a core metal having an outer diameter of 9 mm and formed from iron, and an elastic layer having a thickness of 2.5 mm and formed from silicone rubber on the outer peripheral side of the core metal. The elastic layer is formed from silicone rubber or fluorine rubber that has heat resistance. The outer diameter of the pressurizing roller 110 is preferably about 10 mm to about 50 mm. The smaller the outer diameter of the pressurizing roller 110 is, the smaller the heat capacity is, but if the outer diameter is too small, the width of the fixing nip Nf is small, thus there is a possibility that the toner image is not sufficiently heated and fixation of the toner image is degraded. In the present example, the outer diameter of the pressurizing roller 110 is set to 14 mm. The heat capacity can be also suppressed when the elastic layer is thinner, but if the elastic layer is too thin, the heat is likely to dissipate to the core metal formed from metal to degrade the total heat efficiency of the fixing portion 9, and therefore an appropriate thickness is required.

A releasing layer that enhances the releasability for toner may be provided on the outer peripheral surface of the elastic layer of the pressurizing roller 110. In the present example, a releasing layer formed from perfluoroalkoxy resin (PFA) is provided. The releasing layer may be formed by covering the surface with a tube or coating the surface with a paint similarly to the releasing layer of the fixing film 112, and in the present example, a releasing layer having a thickness of 20 µm and formed from a tube excellent in durability is used. As the material of the releasing layer, fluorine resin such as PTFE or FEP, a fluorine rubber having high releasability, silicone rubber, or the like may be used instead of PFA. When the surface hardness of the pressurizing roller 110 is lower, a larger width of the fixing nip Nf can be obtained at a lower pressure, but if the surface hardness is too low, the durability is degraded. The surface hardness of the pressurizing roller 110 of the present example is set to 40° in terms of Asker-C hardness (load: 600 g).

A temperature detection element 115 such as a thermistor for detecting the temperature of the heater 113 is disposed on the back surface of the heater 113. The controller of the image forming apparatus 100 controls power supply to the heat generating resistor in accordance with the output signal of the temperature detection element 115, and thus the heat generation amount of the heater 113 is controlled such that the heater 113 is at a predetermined target temperature (adjusted temperature). The controller controls the heat generation amount of the heater 113 such that the surface temperature of the fixing film 112 at the fixing nip Nf is maintained at a temperature suitable for fixation of the toner image. The adjusted temperature of the fixing portion 9 in the case of using a plain paper sheet as the recording material P is, for example, 180° C.

The discharge portion 16 is a conveyance unit (discharge unit) that discharges the recording material P on which image formation has been completed to the outside of the housing 101. The discharge portion 16 includes a discharge roller pair constituted by a discharge driving roller 81 and a discharge driven roller 82. The discharge driving roller 81 is a driving roller that rotates by receiving a driving force of a drive source, and the discharge driven roller 82 is a driven roller that forms a nip portion together with the discharge driving roller 81 and rotates by following the discharge driving roller 81.

The discharge portion 16 is disposed on the inside or in the vicinity of the discharge port 16s of the housing 101. The discharge portion 16 nipping and conveying the recording material P by the discharge driving roller 81 and the discharge driven roller 82 in the discharge direction Dc, and thus discharges the recording material P from the inside to the outside of the housing 101 through the discharge port 16s. A discharge tray 17 on which the recording material P discharged by the discharge portion 16 is stacked is provided on the upper surface of the housing 101.

In the case of simplex printing the recording material P having passed through the fixing nip Nf is discharged as it is by the discharge portion 16 through the discharge port 16s as illustrated in FIG. 1A. In the case of duplex printing as illustrated in FIG. 2, after the trailing end of the recording material P in the discharge direction Dc has passed through the fixing nip Nf, the discharge driving roller 81 is rotationally driven in a direction opposite to the rotational direction following the discharge direction Dc, and the conveyance direction of the recording material P is reversed. That is, the recording material P on the first surface of which an image has been formed while being conveyed in the main conveyance path CP1 is switched back at the discharge portion 16, and is conveyed to the duplex conveyance path CP2. In other words, in the present example, the discharge portion 16 functions as a reverse conveyance portion that reverses the recording material P in the case of duplex printing. To be noted, a reverse conveyance roller pair serving as a reverse conveyance portion that reverses the recording material P may be provided in addition to the discharge portion 16. The recording material P conveyed along the duplex conveyance path CP2 is conveyed to the main conveyance path CP1 again in a state in which the first surface and the second surface thereof are switched. Then, an image is formed on the second surface of the recording material P while the recording material P is conveyed in the main conveyance path CP1 again, and the recording material P is discharged through the discharge port 16s by the discharge portion 16.

Duplex Conveyance Path

The duplex conveyance path CP2 will be described. As illustrated in FIG. 2, the duplex conveyance path CP2 is defined by a duplex guide 13, a duplex rib 42, a U-shaped guide 43, and the like. In other words, the housing 101 includes the duplex guide 13, the duplex rib 42, and the U-shaped guide 43. The duplex guide 13, the duplex rib 42, and the U-shaped guide 43 are each an example of a guide member that defines part of the conveyance path CP (part of the duplex conveyance path CP2).

In the present example, the main conveyance path CP1 extends approximately in the vertical direction toward the discharge portion 16 from the feeding portion 6. The duplex conveyance path CP2 extends in a direction (toward the −Y side) opposite to the discharge direction Dc in the Y-axis direction and extends downward (toward the −Z side) in the vertical direction, from the branching portion from the main conveyance path CP1. The duplex conveyance path CP2 merges with the main conveyance path CP1 via a U-shaped curved portion that is curved such that the duplex conveyance path CP2 is curved upward (toward the +Z side) in the vertical direction while extending toward the same side (+Y side) as the discharge direction Dc in the Y-axis direction.

The duplex guide 13 defines part of the duplex conveyance path CP2 (upstream portion of the duplex conveyance path CP2). The duplex guide 13 is an example of a guide member (second guide portion) defining a second conveyance path. The duplex guide 13 guides the first surface of the recording material P.

The duplex guide 13 has a shape curved to have a convex shape convex upward as viewed in the direction (X-axis direction) of the rotational axis of the photosensitive drum 1. In other words, the upper surface of the duplex guide 13 (second guide portion) is curved to have a convex shape convex upward as viewed in the width direction (X-axis direction) orthogonal to both the vertical direction and the discharge direction Dc. As viewed in the X-axis direction (width direction), the duplex guide 13 (second guide portion) is positioned between the discharge port 16s and the ventilating portion 51 (opening portion) of the housing 101 in a direction (Y-axis direction) orthogonal to the vertical direction.

Figure 6:
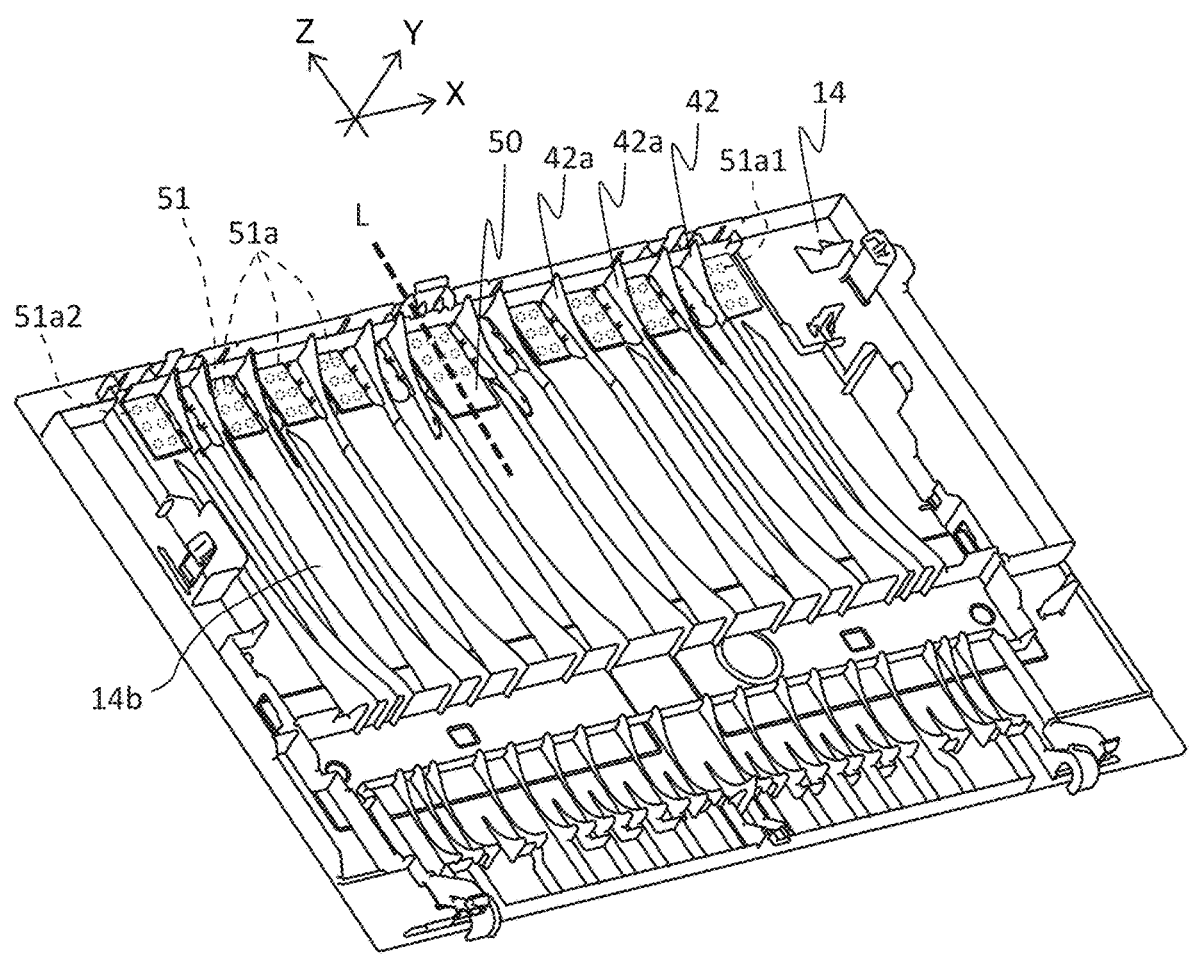
FIG. 6 is a perspective view of aback door according to the example.

The duplex rib 42 is part of the back door 14 (FIG. 6). The duplex rib 42 defines part (portion extending downward in the vertical direction) of the duplex conveyance path CP2 together with a guide portion 15a (FIG. 3) of a transfer guide unit 15. That is, the guide portion 15a of the transfer guide unit 15 is an example of an opposing portion opposing an inner surface 14b of the exterior member (back door 14) with a gap therebetween. In addition, the guide portion 15a is an example of a guide portion opposing the inner surface 14b of the exterior member (back door 14) and defining part of the conveyance path CP together with the exterior member (back door 14). In other words, the gap (space) provided between the inner surface 14b and the guide portion 15a is part of the conveyance path CP (part of the duplex conveyance path CP2) that the recording material P passes through. It can be said that a space continuous with the gap provided between the inner surface 14b and the guide portion 15a communicates with the outside of the housing 101 through the ventilating portion 51. To be noted, the upper end portion of the duplex rib 42 in the present example opposes the duplex guide 13, and is curved in accordance with the curved shape of the duplex guide 13 as viewed in the X-axis direction.

The duplex rib 42 includes a plurality of rib shapes 42a (FIG. 6) arranged in the width direction. The rib shapes 42a each protrude inward (toward the +Y side) in the housing 101 with respect to the inner surface 14b of the back door 14, and extend approximately in the Z-axis direction. That is, the back door 14 has rib shapes protruding in a direction approaching the guide portion 15a of the transfer guide unit 15 from the inner surface 14b and extending in a recording material conveyance direction in the conveyance path. The duplex rib 42 comes into contact with the recording material P on the ridge line portion (end surface on the +Y side) of the rib shapes 42a, and guides the second surface of the recording material P.

The U-shaped guide 43 defines a curved portion of the duplex conveyance path CP2. The U-shaped guide 43 guides the first surface of the recording material P Jam Removal In the case where a jam in which the recording material P stagnates in the image forming apparatus 100 during printing has occurred, the user can perform so-called jam removal of removing the stagnating recording material P from the inside of the image forming apparatus 100.

Figure 3A:
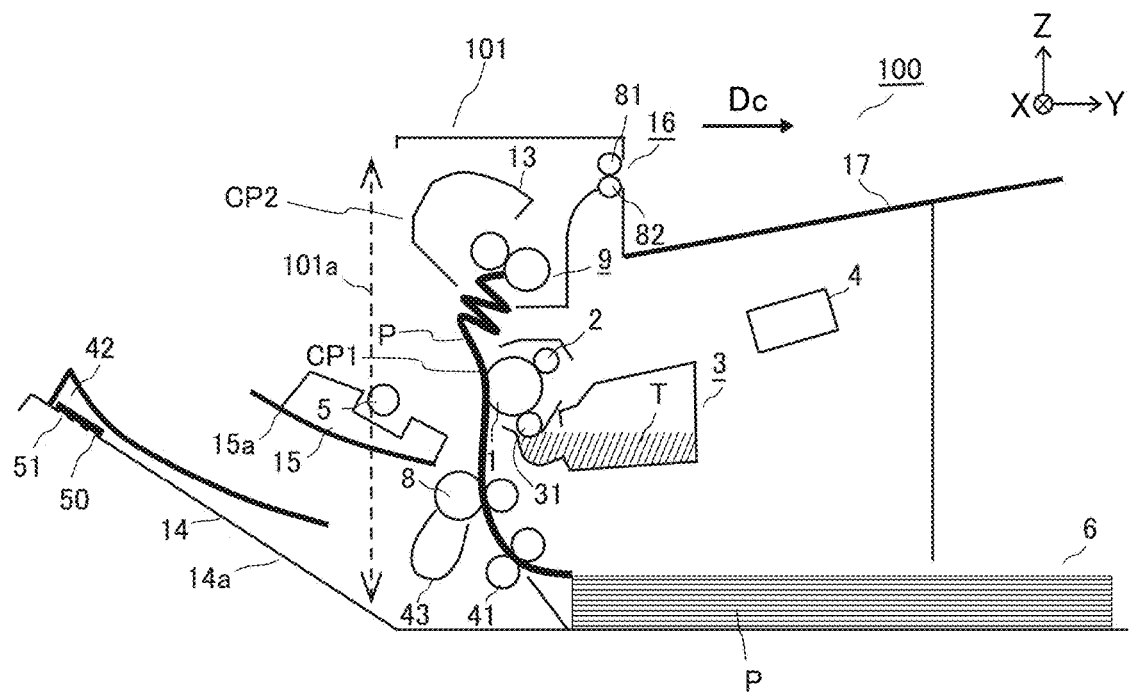
FIG. 3A is a schematic view of the image forming apparatus according to the example.
Figure 3B:
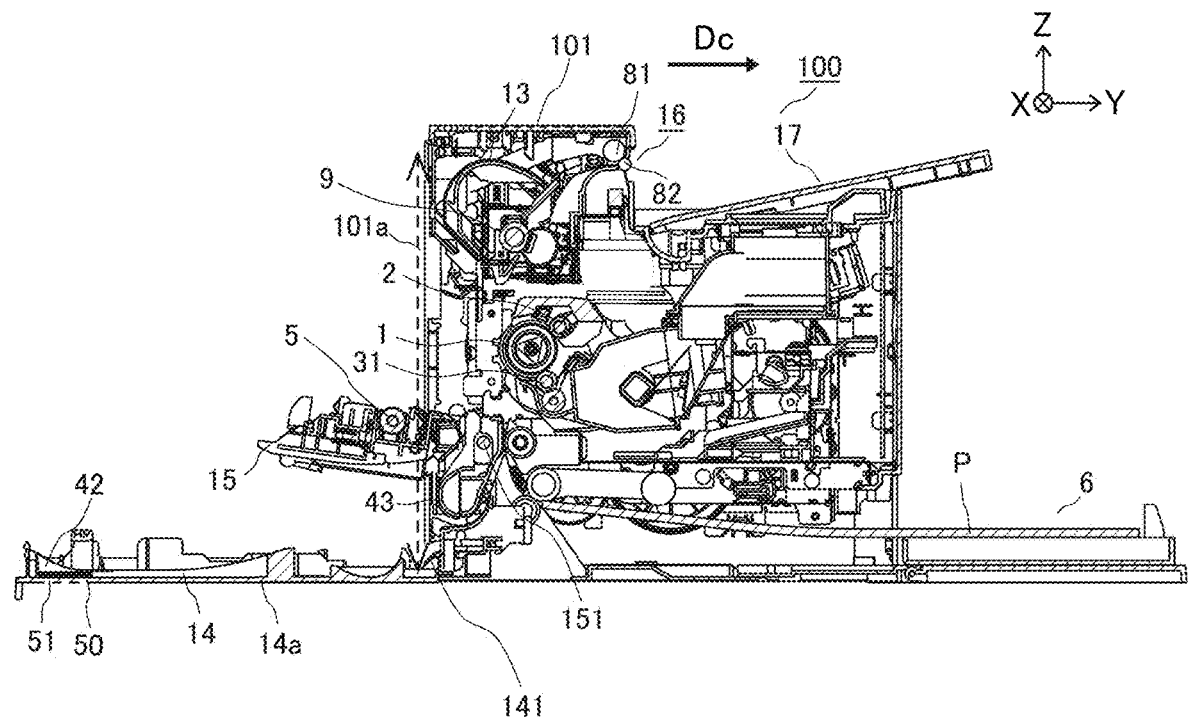
FIG. 3B is a detailed view of the image forming apparatus according to the example.

As illustrated in FIGS. 3A and 3B, the housing 101 of the image forming apparatus 100 includes the back door 14 and the transfer guide unit 15. The back door 14 and the transfer guide unit 15 are each an opening/closing member provided to be openable and closeable with respect to the other portions of the housing 101. The back door 14 and the transfer guide unit 15 are opened and closed in the case where the user performs the jam removal.

The housing 101 of the image forming apparatus 100 includes the back door 14 and the transfer guide unit 15. The back door 14 is an exterior member (rear cover) having an outer surface 14a serving as an exterior surface (second exterior surface) on the rear side (−Y side) of the housing 101.

The back door 14 is movable to an open position (FIGS. 3A and 3B) where a body opening 101a provided on the rear side of the housing 101 is open, and a closed position (FIG. 1A) where the body opening 101a is closed. The back door 14 of the present example pivots about an axis extending in the X-axis direction about a hinge portion 141 provided at a lower end portion of the back door 14 positioned at the closed position. When the back door 14 is at the closed position, the recording material P can pass through the duplex conveyance path CP2. That is, the closed position of the back door 14 is a position at the time when the image forming apparatus 100 can perform the image forming operation. When the back door 14 is at the open position, at least part of the duplex conveyance path CP2 is opened, and thus the recording material P stagnating in the duplex conveyance path CP2 can be accessed from the outside of the housing 101. In other words, in a state in which the back door 14 serving as an exterior member is positioned at the open position, removal of the recording material P from part of the conveyance path CP (duplex conveyance path CP2) through the body opening 101a is allowed.

The transfer guide unit 15 includes the guide portion 15a that defines part of the duplex conveyance path CP2 together with the duplex rib 42 of the back door 14, and the transfer roller 5 described above. The transfer guide unit 15 is disposed between the back door 14 and the photosensitive drum 1. More specifically, the transfer guide unit 15 is disposed between the photosensitive drum 1 and the gap (space) provided between the inner surface 14b and the guide portion 15a. In the vertical direction, the transfer guide unit 15 is positioned below the ventilating portion 51, and the upper end of the transfer guide unit 15 is positioned above the photosensitive drum 1.

The transfer guide unit 15 is movable to a closed position (blocking position, FIG. 1A) where the photosensitive drum 1 is covered as viewed from the rear side (−Y side) and an open position (exposing position, FIGS. 3A and 3B) where the photosensitive drum 1 is exposed as viewed from the rear side (−Y side). The transfer guide unit 15 of the present example pivots about an axis extending in the X-axis direction about a hinge portion 151 provided at a lower end portion of the transfer guide unit 15 positioned at the closed position. The position of the hinge portion 151 can be referred to as the position of the rotational axis of the transfer guide unit 15. In the vertical direction, the position of the rotational axis of the transfer guide unit 15 is positioned above the ventilating portion 51 and the photosensitive drum 1.

When the transfer guide unit 15 is at the closed position, the recording material P can pass through the main conveyance path CP1. That is, the closed position of the transfer guide unit 15 is a position at the time when the image forming apparatus 100 can perform the image forming operation. When the back door 14 is at the open position and the transfer guide unit 15 is at the open position, at least part of the main conveyance path CP1 is opened, and thus the recording material P stagnating in the main conveyance path CP1 can be accessed from the outside of the housing 101.

The transfer guide unit 15 of the present example is urged in a direction from the open position toward the closed position by a spring member. By urging the transfer guide unit 15 by the spring member, the contact pressure between the transfer roller 5 and the photosensitive drum 1 can be more stabilized.

In the case where the recording material P stagnates in the main conveyance path CP1, as illustrated in FIGS. 3A and 3B, the user opens both the back door 14 and the transfer guide unit 15. FIGS. 3A and 3B are a schematic diagram and a detailed diagram illustrating the jam removal in the case where the recording material P does not successfully pass through the fixing portion 9 and stagnates in the main conveyance path CP1. By opening both the back door 14 and the transfer guide unit 15, the user can grip and remove the recording material P stagnating in the main conveyance path CP1. Then, the user closes the back door 14 and the transfer guide unit 15 again, and thus the image forming apparatus 100 returns to the state in which the image forming operation can be performed.

As illustrated in FIG. 2, a jam can occur while the recording material P passes through the duplex conveyance path CP2 in duplex printing. In this case, it suffices if the user opens just the back door 14. By opening the back door 14, the user can grip and remove the recording material P stagnating in the duplex conveyance path CP2. Then, the user closes the back door 14 again, and thus the image forming apparatus 100 returns to the state in which the image forming operation can be performed.

Layer Configuration of Photosensitive Drum

Figure 1B:
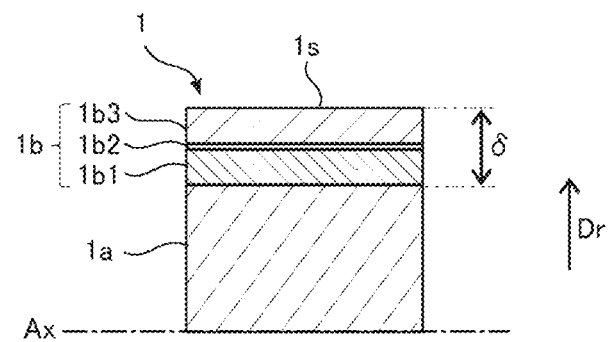
FIG. 1B is an explanatory diagram of a photosensitive drum according to the example.

A layer configuration of the photosensitive drum 1 will be described with reference to FIG. 1B. FIG. 1B schematically illustrates the layer configuration of the photosensitive drum 1. The photosensitive drum 1 includes a conductive base body (hereinafter simply referred to as a base body 1a), and a surface layer portion 1b formed on the outer periphery of the base body 1a. The surface layer portion 1b of the present embodiment includes an undercoat layer 1b1, a charge generating layer 1b2, and a charge transporting layer 1b3.

The charge generating layer 1b2 and the charge transporting layer 1b3 function as a photosensitive layer (photoconductive layer) that attenuates the potential of a surface 1s in response to light irradiation. The charge generating layer 1b2 absorbs light radiated from the scanner unit 4 and thus generates electrical charges. The charge transporting layer 1b3 has a function as an insulating layer that holds the surface charges imparted to the surface 1s in a charging step, and a function of transporting the charges generated in the charge generating layer 1b2 to the surface 1s.

The photosensitive layer of the present example is a negatively-chargeable organic photoconductor (OPC). That is, when a pair of charges is generated in the charge generating layer 1b2 in response to the light irradiation, the charge transporting layer 1b3 transports a positive charge toward the surface 1s of the photosensitive drum 1, and a negative surface charge imparted to the surface 1s in the charging step is thus neutralized. As a result of this, the surface potential of the irradiated region irradiated with the light from the scanner unit 4 is attenuated, and thus an electrostatic latent image is formed on the surface 1s of the photosensitive drum 1.

The photosensitive drum 1 rotates about a rotational axis Ax. In the present example, the direction of the rotational axis Ax is parallel to the X-axis direction. A direction orthogonal to the rotational axis Ax of the photosensitive drum 1 will be referred to as a radial direction Dr of the photosensitive drum 1. The radial direction Dr is a radial direction of a virtual circle centered on the rotational axis Ax as viewed in the X-axis direction.

The distance from the outer peripheral surface of the base body 1a to the surface 1s of the photosensitive drum 1 in the radial direction Dr will be referred to as the thickness δ (μm) of the surface layer portion 1b. In the present embodiment, the film thickness of the undercoat layer 1b1 is 25 μm, the film thickness of the charge generating layer 1b2 is 1 μm, and the film thickness of the charge transporting layer 1b3 is 22 μm. Therefore, the thickness δ of the surface layer portion 1b of the photosensitive drum 1 is 25+1+22=48 (μm). To be noted, the film thickness of each layer constituting the surface layer portion 1b is not limited to this, and the total thickness of the surface layer portion 1b is not limited to this.

The layer configuration of the surface layer portion 1b is not limited to that described above. For example, the surface layer portion 1b may include a releasing layer (protective layer) for improving the toner releasability on the outer peripheral surface of the charge transporting layer 1b3. In this case, the film thickness of the releasing layer (protective layer) is included in the thickness of the surface layer portion 1b. In addition, a photosensitive layer having a single layer structure including a charge generating material and a charge transporting material may be used instead of the charge generating layer 1b2 and the charge transporting layer 1b3.

As the accumulated sheet-passing number of the image forming apparatus 100 increases, the surface layer portion 1b of the photosensitive drum 1 gradually wears. The thickness of the surface layer portion 1b in the present embodiment is based on the state immediately after shipping from the factory (state in which the accumulated sheet-passing number is substantially 0) unless otherwise described.

A more specific configuration example of the photosensitive drum 1 will be described below. The base body 1a is a member (aluminum cylinder) of a drum shape (columnar shape) formed from aluminum and having a diameter of 24 mm. The surface layer portion 1b is formed by sequentially applying the undercoat layer 1b1, the charge generating layer 1b2, and the charge transporting layer 1b3 on the outer peripheral surface of the base body 1a by a dipping coating method. The photosensitive drum 1 is a columnar member overall having a relatively high stiffness.

Examples of the undercoat layer 1b1 include a layer mainly formed from resin, a layer mainly formed from white pigment and resin, and a metal oxide film obtained by chemically or electrochemically oxidizing the surface of the base body 1a. Examples of the resin used for the undercoat layer 1b1 include thermoplastic resins such as polyamide resin, polyvinyl alcohol resin, casein resin, and methylcellulose resin, and thermosetting resins such as acrylic resin, phenol resin, melamine resin, alkyd resin, unsaturated polyester resin, and epoxy resin. Examples of the white pigment include metal oxides such as titanium oxide, aluminum oxide, zirconium oxide, and zinc oxide. Among these, titanium oxide excellent in resistance to charge injection from the base body 1a is a preferred white pigment. In the white pigment in the undercoat layer 1b1, the use amount of titanium oxide is 60% to 1000% by weight, preferably 70% to 100% by weight, and more preferably 80% to 100% by weight. In the case where the use amount of titanium oxide is smaller than 60%, the characteristics of the undercoat layer is likely to change in accordance with an environmental change, and the effect of blocking charge injection from a conductive support body becomes unstable, which can be not desirable.

The undercoat layer 1b1 is formed between the base body 1a and the photosensitive layer (charge generating layer 1b2 and the charge transporting layer 1b3), and functions as an intermediate layer that restricts charge injection from the base body 1a to the photosensitive layer.

Known organic materials and inorganic materials can be used as the material for the photosensitive layer (charge generating layer 1b2 and charge transporting layer 1b3), and known methods can be used as the method for forming the photosensitive layer.

Examples of the charge generating material used for the charge generating layer 1b2 include organic pigments and dyes such as mono-azo pigments, bis-azo pigments, tris-azo pigments, tetrakis-azo pigments, triarylmethane dyes, thiazine dyes, oxazine dyes, xanthene dyes, cyanine colorants, styryl colorants, pyrylium dyes, quinacridone pigments, indigo pigments, perylene pigments, polycyclic quinone pigments, bis-benzimidazole pigments, indanthrone pigments, squarylium pigments, and phthalocyanine pigments, and inorganic materials such as selenium, selenium-arsenic, selenium-tellurium, cadmium sulfide, zinc oxide, titanium oxide, and amorphous silicon. These charge generating materials may be used individually or as a mixture.

Examples of the charge transporting material used for the charge transporting layer 1b3 include anthracene derivatives, pyrene derivatives, carbazole derivatives, tetrazole derivatives, metallocene derivatives, phenothiazine derivatives, pyrazoline compounds, hydrazone compounds, styryl compounds, styryl hydrazone compounds, enamine compounds, butadiene compounds, distyryl compounds, oxazole compounds, oxadiazole compounds, thiazole compounds, imidazole compounds, triphenylamine derivatives, phenylenediamine derivatives, aminostilbene derivatives, and triphenylmethane derivatives. These charge transporting materials may be used individually or as a mixture.

In addition, examples of binder resin that can be used for forming the photosensitive layer include known thermoplastic resins, thermosetting resins, photocurable resins, and photoconductive resins. Examples of suitable binder resins include thermoplastic resins such as polyvinyl chloride, polyvinylidene chloride, polyvinyl chloride-vinyl acetate copolymer, vinyl chloride-vinyl acetate-maleic anhydride copolymer, ethylene-vinyl acetate copolymer, polyvinyl butyral, polyvinyl acetal, polyester, phenoxy resin, (meth) acrylic resin, polystyrene, polycarbonate, polyarylate, polysulfone, polyethersulfone, and ABS resin, thermosetting resins such as phenol resin, epoxy resin, urethane resin, melamine resin, isocyanate resin, alkyd resin, silicone resin, and thermosetting acrylic resin, polyvinylcarbazole, polyvinylanthracene, and polyvinylpyrene. These resins may be used individually or as a mixture.

Discharge Port

Figure 4A:
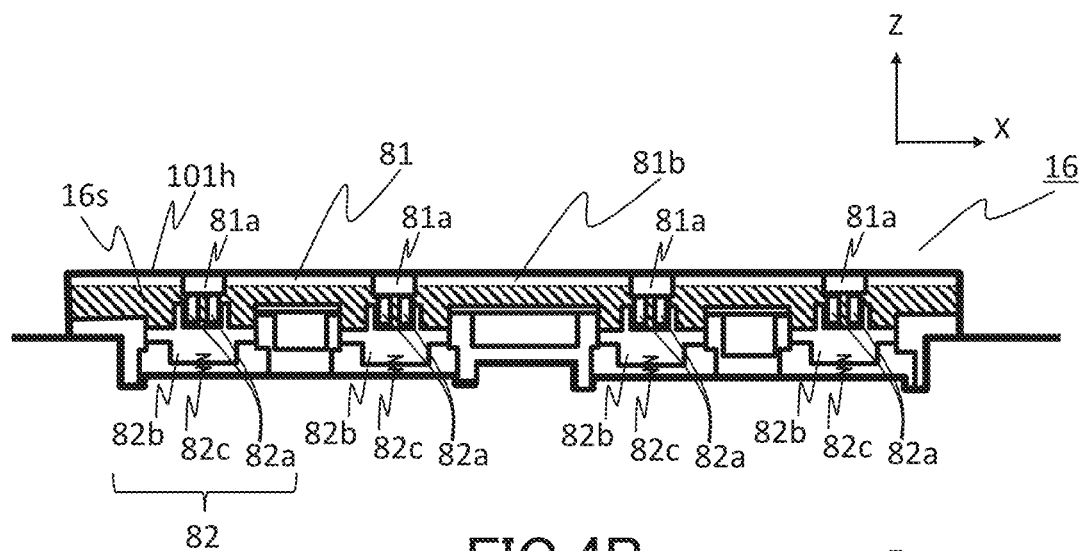
FIGS. 4A and 4B are diagrams illustrating a discharge port according to the example.
Figure 4B:
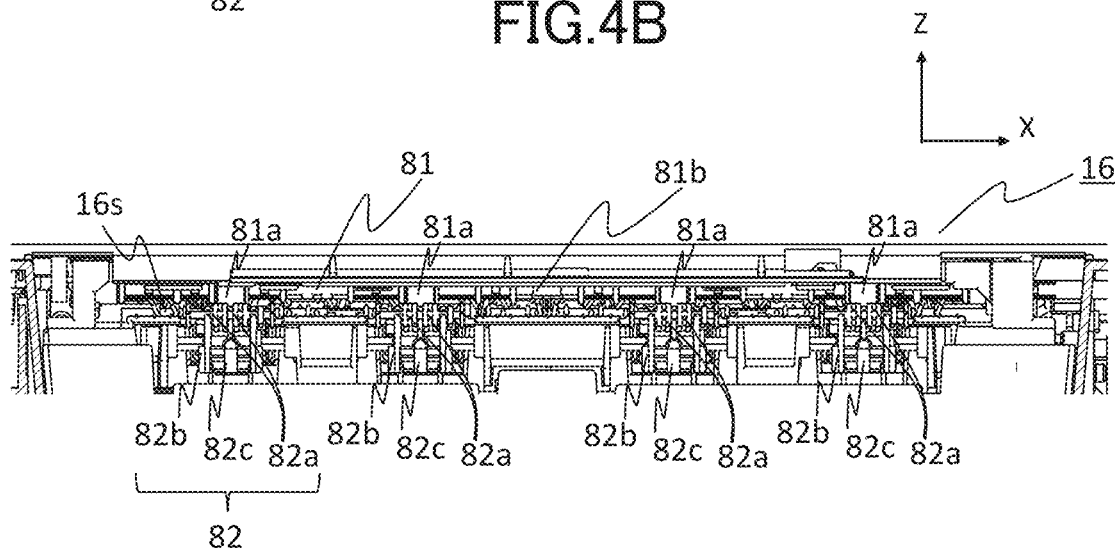

A configuration of the discharge port 16s of the present example will be described with reference to FIGS. 4A and 4B. FIG. 4A is a schematic diagram illustrating the discharge portion 16 of the present example as viewed from the front side (+Y side) of the image forming apparatus 100, and FIG. 4B is a detailed diagram of FIG. 4B.

In the present example, the discharge port 16s is an opening provided in a wall surface 101f (FIG. 1A) facing to the front side (+Y side) of the housing 101, and is an opening that the recording material P discharged by the discharge portion 16 passes through. In other words, the housing 101 includes the wall surface 101f serving as a first exterior surface that faces in the discharge direction Dc and is provided with the discharge port 16s that the recording material P discharged by the discharge portion 16 passes through. To be noted, the wall surface 101f extends upward from the upstream end of the discharge tray 17 in the discharge direction Dc, and functions as a standard surface that aligns the recording material P by abutting the trailing end of the recording material P stacked on the discharge tray 17.

More specifically, in the present example, the discharge port 16s is an opening defined in the wall surface 101f of the housing 101 and extending to the inside of the image forming apparatus 100 when the image forming apparatus 100 is viewed from the front side (+Y side). In the present example, the conveyance path CP that is a space inside the image forming apparatus 100 and the space on the outside of the image forming apparatus 100 communicate with each other through the discharge port 16s.

Here, the configuration of the discharge portion 16 will be described. It is preferable that at least one roller of the roller pair for nipping and conveying the sheet material such as the recording material P is a divided roller including a plurality of rotary members (driving and driven roller portions) that each come into contact with the recording material P The divided roller is a roller which includes a plurality of rotary members each having a width smaller than the maximum width of the recording material P serving as a conveyance target in the width direction of the recording material P orthogonal to the discharge direction Dc of the recording material P and in which the plurality of rotary members are arranged in the width direction. As a result of using the divided roller, a situation in which rollers in the roller pair do not come into contact with each other or the contact pressure becomes insufficient in a partial region in the width direction that is caused by warpage of the roller become less likely to occur, and thus the recording material P can be conveyed more stably.

Each of the rollers of the roller pair for nipping and conveying the sheet material may be a divided roller. The discharge portion 16 of the present example is a roller pair including the discharge driving roller 81 and the discharge driven roller 82 that are each a divided roller.

The discharge driving roller 81 includes a shaft 81b extending in the width direction and a plurality of rubber roller portions 81a serving as a plurality of rotary members. In the present example, four rubber roller portions 81a are attached to one shaft 81b. A driving gear is provided at an end portion of the shaft 81b, and a driving force is input thereto from a drive source via the driving gear. As a result of input of the driving force to the shaft 81b, the shaft 81b and the four rubber roller portions 81a rotate integrally.

The discharge driven roller 82 includes a plurality of roller portions 82a serving as a plurality of rotary members, a plurality of roller holders 82b that hold the roller portions 82a, and a plurality of springs 82c that urge the roller holders 82b. The discharge driven roller 82 of the present example includes four roller portions 82a serving as a plurality of rotary members, four roller holders 82b that hold the roller portions 82a, and four springs 82c in correspondence with the four rubber roller portions 81a of the discharge driving roller 81. The roller portions 82a are each rotatably supported by corresponding one of the roller holders 82b. In addition, as a result of each roller holder 82b being urged by corresponding one of the springs 82c, the roller portion 82a corresponding thereto is in pressure contact with corresponding one of the rubber roller portions 81a. Each roller portion 82a rotates by following corresponding one of the rubber roller portions 81a.

In four regions apart from each other in the width direction, nip portions where the rubber roller portions 81a of the discharge driving roller 81 come into contact with the roller portions 82a of the discharge driven roller 82 are formed. The discharge portion 16 nips the recording material P in the nip portions described above, and conveys the recording material P in the discharge direction Dc by rotational driving of the discharge driving roller 81.

Since the discharge portion 16 has the configuration described above, the discharge port 16s serving as a region (hatched region of FIG. 4A) where the rotary members of the divided roller are not present is defined inside an opening 101h defined in the wall surface 101f of the housing 101. That is, in the present example, the "discharge port 16s" is a region obtained by excluding parts such as the rubber roller portions 81a of the discharge driving roller 81 and the roller portions 82a of the discharge driven roller 82 (that is, part that the recording material P cannot pass through) from the region inside the opening 101h provided in the wall surface 101f of the housing 101 when the image forming apparatus 100 is viewed from the front side (+Y side).

Ventilating Portion Near Fixing Portion

Figure 5:
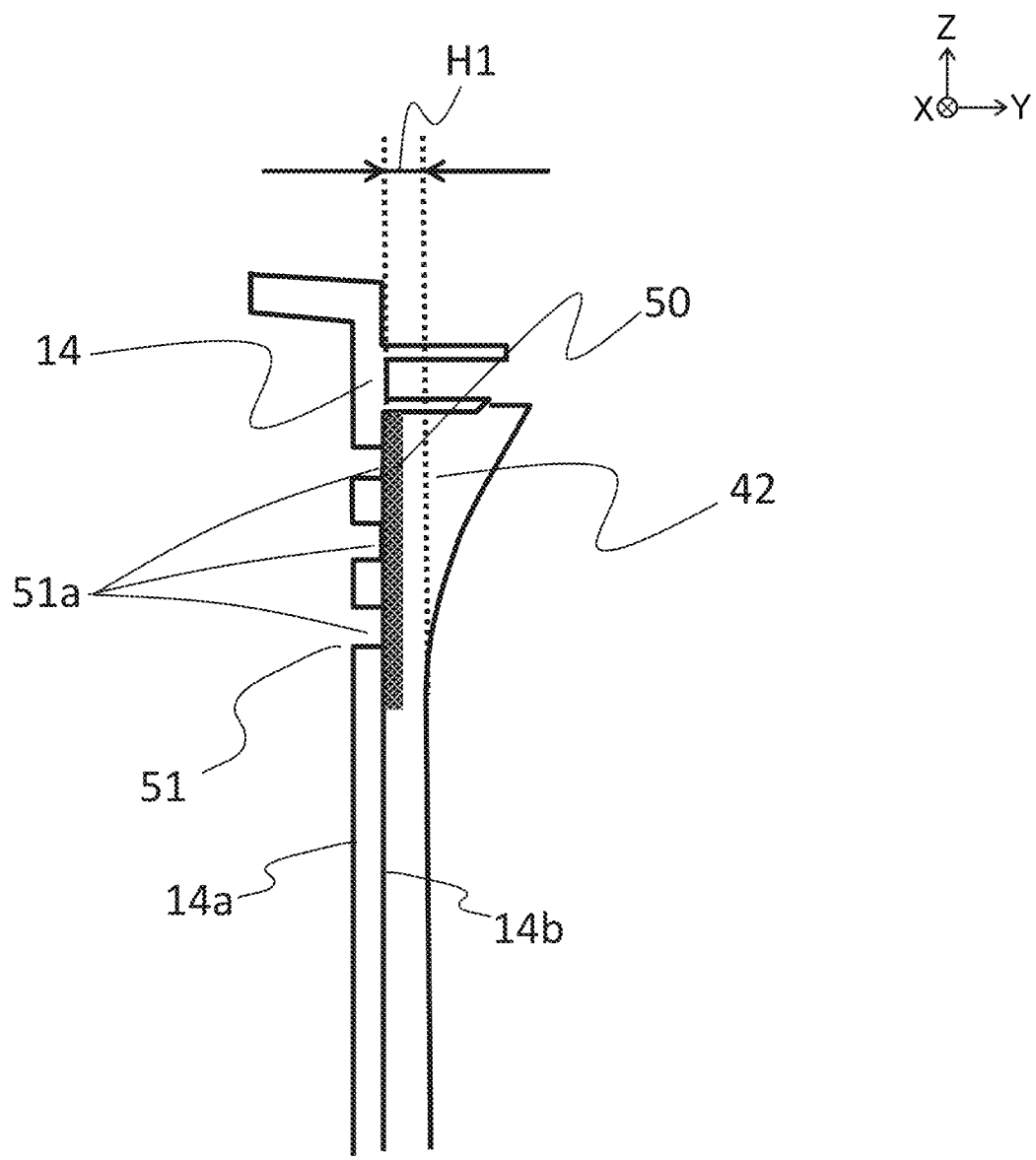
FIG. 5 is a diagram illustrating a ventilating portion and a filter according to the example.

The ventilating portion 51 serving as an opening portion provided in the vicinity of the fixing portion 9 of the image forming apparatus 100 will be described. FIG. 5 is a schematic diagram illustrating the ventilating portion 51, and illustrates a cross-section of the back door 14 orthogonal to the X-axis direction in which the ventilating portion 51 is provided. FIG. 6 is a perspective view of the back door 14. To be noted, FIG. 5 illustrates a cross-section taken along a dot line L in FIG. 6. In addition, as will be described later, since filters 50 covering the ventilating portion 51 is provided, the position of each of the vent holes 51a of the ventilating portion 51 is indicated by a dot line in FIG. 6.

As illustrated in FIG. 5, the ventilating portion 51 includes at least one vent hole 51a serving as an opening through which the outside and the inside of the image forming apparatus 100 communicate. More specifically, the outside of the image forming apparatus 100 communicates with the conveyance path CP (particularly the duplex conveyance path CP2 in the present example) that is a space inside the image forming apparatus 100 through the vent hole 51a. The ventilating portion 51 of the present example includes a plurality of vent holes 51a.

The vent hole 51a is opened toward the outside of the image forming apparatus 100 in the outer surface 14a that is a surface facing in a direction (−Y direction) opposite to the discharge direction Dc of the back door 14. In other words, the housing 101 includes the outer surface 14a serving as a second exterior surface facing in a direction opposite to the discharge direction Dc of the recording material P and provided with an opening portion (ventilating portion 51) through which the outside of the housing 101 and the conveyance path CP that the recording material P passes through in the housing 101 communicate with each other.

In the image forming apparatus 100, heat is generated in the fixing portion 9 that is of a thermal fixation system. When heat is accumulated in the image forming apparatus 100, there is a possibility that, for example, the temperature of the toner is raised and thus the nature of the toner changes, or aging of parts of the image forming apparatus 100 is accelerated. The ventilating portion 51 suppresses these problems by discharging the heat generated in the fixing portion 9 to the outside of the image forming apparatus 100.

In addition, in the fixing portion 9, water vapor is generated from the recording material P heated when passing through the fixing nip Nf. When water vapor is accumulated in the image forming apparatus 100, there is a possibility that, for example, water condensation occurs in the conveyance path CP, thus a water droplet attaches to the recording material P to cause an image defect or accelerate aging (rust of metal members, etc.) of parts of the image forming apparatus 100. The water vapor generated in the fixing portion 9 is discharged to the outside of the image forming apparatus 100 through the ventilating portion 51, and thus these problems are suppressed. In the Z-axis direction, the ventilating portion 51 is positioned above the photosensitive drum 1.

Heat and water vapor tend to move upward. Therefore, at least part of the ventilating portion 51 is positioned above an upper end position of the fixing nip Nf in the Z-axis direction (FIG. 1A). In addition, at least part of the discharge port 16s is positioned above the upper end position of the fixing nip Nf in the Z-axis direction (FIG. 1A). In other words, at least part of the discharge port 16s and at least part of the opening portion (ventilating portion 51) are positioned above the upper end position of the nip portion (fixing nip Nf) in the vertical direction.

The ventilating portion 51 of the present example is disposed at an upper end portion of the outer surface 14a of the back door 14 constituting the exterior surface (second exterior surface) on the rear side of the image forming apparatus 100. In the present example, the lower end position of the ventilating portion 51 is positioned above the upper end position of the fixing nip Nf in the Z-axis direction. In addition, in the present example, the lower end position of the discharge port 16s is positioned above the upper end position of the fixing nip Nf in the Z-axis direction. To be noted, the ventilating portion 51 can be also provided in a top surface of the housing 101.

A range in which the ventilating portion 51 is provided in the X-axis direction (width direction) will be hereinafter referred to as an installation range of the ventilating portion 51. In the case where the ventilating portion 51 includes the plurality of vent holes 51a (plurality of openings) provided at different positions in the X-axis direction as in the present example, the installation range of the ventilating portion 51 can be defined as follows. That is, a range in the X-axis direction from a vent hole 51a1 (first opening) that is the farthest on one side (+X side) in the X-axis direction among the plurality of vent holes 51a to a vent hole 51a2 (second opening) that is the farthest on the other side (−X side) in the X-axis direction is defined as the installation range of the ventilating portion 51 is defined as the installation range of the ventilating portion 51. As illustrated in FIG. 6, in the X-axis direction, the installation range of the ventilating portion 51 overlaps with the position of a dot line L. In other words, the dot line L is positioned between one end (position of the vent hole 51a1) and the other end (position of the vent hole 51a2) of the installation range of the ventilating portion 51 in the X-axis direction. To be noted, the position of the dot line L in the X-axis direction coincides with the position of the center of the conveyance path CP in the X-axis direction and the position of the center of the passage region of the recording material P in the X-axis direction.

In the fixing portion 9, heat for fixing the toner image is mainly generated in the passage region of the recording material P in the X-axis direction (width direction). In addition, since water vapor is generated from the recording material P by heating the recording material P in the fixing nip Nf, water vapor is generated in the passage region of the recording material P in the X-axis direction (width direction). Here, among recording materials P on which the image forming operation can be performed by the image forming apparatus 100, a recoding material P having the largest size in the X-axis direction (width direction) will be referred to as a recording material P of the maximum size. Therefore, the installation range of the ventilating portion 51 preferably overlaps with the passage region of the recording material P of the maximum size in the X-axis direction (width direction). In the present example, the installation range of the ventilating portion 51 overlaps with the passage region of the recording material P of the LTR size that is of the maximum sheet-passing width of the image forming apparatus 100. As a result of this, heat and water vapor generated in the fixing portion 9 can be efficiently discharged to the outside of the image forming apparatus 100.

In the X-axis direction (width direction), the length of the installation range of the ventilating portion 51 (length from one end to the other of the installation range of the ventilating portion 51) is preferably 50% or more, and more preferably 70% or more of the length of the conveyance path CP. In addition, in the X-axis direction, the length of the installation range of the ventilating portion 51 is preferably 50% or more, and more preferably 70% or more of the length of the recording material P of the maximum size. In addition, in the X-axis direction, it is preferable that the installation range of the ventilating portion 51 includes a range of the maximum width (effective printing region) on which the image forming portion 10 can form an image. In the present example, in the X-axis direction (width direction), the length of the installation range of the ventilating portion 51 is 90% or more of the recording material P of the maximum size. For the reason described above, in the fixing portion 9, mainly heat and water vapor are generated within the passage region of the recording material P of the maximum size (more specifically, within the passage region of the recording material P of the maximum size (more specifically, within the effective printing region for the recording material P of the maximum size). Therefore, as a result of the ventilating portion 51 being provided in a range that is of a predetermined proportion or more with respect to the recording material P of the maximum size and that includes the effective printing region for the recording material P of the maximum size, the heat and water vapor generated in the fixing portion 9 can be efficiently discharged to the outside of the image forming apparatus 100.

Here, among recording materials P on which the image forming apparatus 100 can perform the image forming operation, a recording material P having the smallest size in the X-axis direction (width direction) will be referred to a recording material P of the minimum size. The installation range of the ventilating portion 51 preferably at least include the passage region of the recording material P of the minimum size. That is, in the X-axis direction (width direction), the length of the installation range of the ventilating portion 51 is larger than the length of the recording material P of the minimum size. This is because regardless of the size of the recording material P, at least part of the recording material P on which an image is formed by the image forming apparatus 100 always passes through the passage region of the recording material P of the minimum size, and therefore water vapor is likely to be generated in the passage region of the recording material P of the minimum size.

In the case where the breathability of the ventilating portion 51 is higher, the amount of heat and water vapor that can be discharged through the ventilating portion 51 is larger, and therefore the problem caused by the accumulation of heat and water vapor can be suppressed more reliably. However, if the breathability of the ventilating portion 51 is too high, the speed of wind passing through the conveyance path CP and then the ventilating portion 51 from the discharge port 16s in the case where a wind blows in from the front side (+Y side) of the image forming apparatus 100 becomes high, and dust becomes more likely to enter. Therefore, the breathability of the ventilating portion 51 may be set in consideration of the balance between the amount of heat and water vapor that can be discharged from the ventilating portion 51 and suppression of the entrance of dust through the discharge port 16s. Specifically, the number of the vent holes 51a of the ventilating portion 51, the opening area of each individual vent hole 51a, the total opening area of all the vent holes 51a included in the ventilating portion 51, and the like may be set in consideration of the balance described above.

As illustrated in FIG. 6, in the present example, each vent hole 51a has a circular shape, and the diameter thereof is, for example, 5 mm. To be noted, the shape and size of the vent hole 51a can be changed.

The ventilating portion 51 of the present example is disposed such that three rows of vent holes 51a in each of which nineteen vent holes 51a are arranged in the X-axis direction (width direction) are arranged in the Z-axis direction. That is, the ventilating portion 51 includes fifty-seven vent holes 51a in total. The width of the range in which the ventilating portion 51 is provided in the X-axis direction (width direction) is 209 mm, which is larger than the width (206 mm) of the effective printing region for the recording material P of the maximum size (LTR size).

In addition, the vent holes 51a are disposed in a region between the plurality of rib shapes 42a of the duplex rib 42 included in the back door 14 in the X-axis direction (width direction). The vent holes 51a penetrate from the outer surface 14a to the inner surface 14b of the back door 14 (FIG. 5).

Filters

The filter 50 included in the image forming apparatus 100 of the present example will be described. As illustrated in FIGS. 5 and 6, the image forming apparatus 100 includes the filter 50 disposed to cover the ventilating portion 51. More specifically, at least one filter 50 covering each of the vent holes 51a of the ventilating portion 51 is attached to the inner surface 14b of the back door 14. By providing the filter 50 covering the ventilating portion 51, as will be described later, occurrence of an image defect caused by dust having entered the inside of the image forming apparatus 100 through the vent holes 51a can be suppressed.

To be noted, in the present disclosure, foreign matter that can enter the inside of the image forming apparatus 100 by being blown by an airflow flowing from the outside to the inside of the image forming apparatus 100 will be collectively referred to as "dust". Therefore, the "dust" may be particles (for example, particles derived from plastics or wood) other than sand particles, or may contain a plurality of kinds of particles.

In the case where the filter 50 is not provided on the ventilating portion 51, there is a possibility that dust having entered the inside of the image forming apparatus 100 through the vent holes 51a moves in the image forming apparatus 100 and attaches to the photosensitive drum 1. Particularly, when dust larger than the thickness (48 μm in the present example) of the surface layer portion 1b of the photosensitive drum 1 attaches to the photosensitive drum 1, there is a possibility that the dust forms a scratch penetrating the surface layer portion 1b when passing a contact portion between the photosensitive drum 1 and another member.

For example, there is a possibility that the dust is strongly pushed into the surface layer portion 1b of the photosensitive drum 1 at the contact portion (charging nip) between the charging roller 2 and the photosensitive drum 1 and thus a scratch is formed on the surface layer portion 1b. As a result of this, an image defect (referred to as a black dot image) of a black dot shape occurs at a position corresponding to the scratch in the surface layer portion 1b of the photosensitive drum 1 in the image formed on the recording material P.

More specifically, when a scratch penetrating the surface layer portion 1b is formed by the dust, the function of the charge transporting layer 1b3 holding the surface charges imparted to the surface 1s in the charging step and the function of the undercoat layer 1b1 (intermediate layer) restricting charge injection from the base body 1a to the photosensitive layer can be degraded. In this case, at the portion where the scratch is formed, the photosensitive drum 1 cannot hold the surface charges imparted in the charging step, and the surface potential of the photosensitive drum 1 becomes closer to the potential of the base body 1a (ground potential) due to the charge injection from the base body 1a. Further, a toner image is developed at the portion where the scratch is formed regardless of whether or not the portion has been exposed to light, and thus a black dot image appears.

Figure 7:
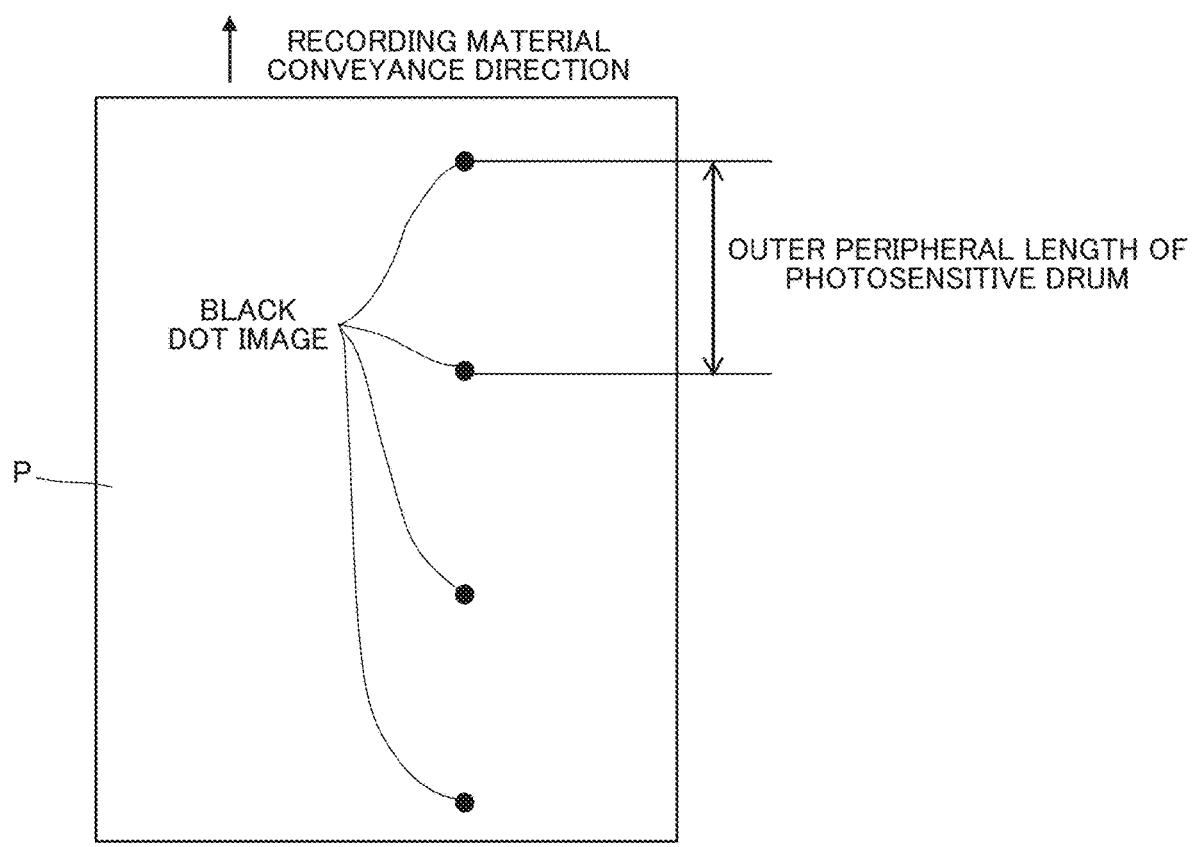
FIG. 7 is a diagram illustrating an example of an image defect caused by dust particles.

FIG. 7 illustrates an example of the black dot image. As illustrated in FIG. 7, black dots periodically appear at a pitch corresponding to the outer peripheral length of the photosensitive drum 1 in accordance with the position of the scratch on the surface layer portion 1b of the photosensitive drum 1. Black dot images repeatedly appear in the conveyance direction of the recording material P at a period corresponding to the outer peripheral length of the photosensitive drum 1 for each scratch formed on the photosensitive drum 1. One row of black dot images appearing periodically as described above will be defined as one streak of black dot images. In addition, the number of streaks of black dot images increases as the number of scratches on the surface layer portion 1b of the photosensitive drum 1 increases.

The filter 50 is formed from a material having breathability, moisture permeability, and high resistance to heat and moisture. In the present example, a sheet material of moltopren (registered trademark) SM-55 that is a urethane foam manufactured by INOAC CORPORATION is used as the filter 50.

In addition, in the present example, a sheet obtained by compressing the sheet material (raw sheet) of the urethane foam described above in the thickness direction by heating and pressing the sheet material is used as the filter 50. The thickness of the raw sheet is 2 mm, and the thickness of the filter 50 is 1 mm.

The thickness of the filter 50 of the present example is set such that the filter 50 does not come into contact with the recording material P conveyed in the duplex conveyance path CP2. That is, as illustrated in FIG. 5, the thickness of the filter 50 is smaller than the protruding amount of the rib shapes 42*a* of the duplex rib 42 with respect to the inner surface 14*b* of the back door 14 at each position in the range in which the filter 50 is provided in the Z-axis direction. In other words, the thickness of the filter 50 is smaller than a minimum value Hi of the protruding height of the duplex rib 42 with respect to the inner surface 14*b* of the back door 14. The minimum value Hi of the protruding amount of the rib shapes 42*a* is, for example, 3.5 mm, and the thickness of the filter 50 is 1 mm.

When the filter 50 comes into contact with the recording material P conveyed in the duplex conveyance path CP2, there is a possibility that skew or jam of the recording material P occurs, or the recording material P is contaminated by water droplet or foreign matter attached to the filter 50. By setting the thickness of the filter 50 to be smaller than the protruding height of the duplex rib 42, the possibility of occurrence of such a problem can be lowered.

For example, the filter 50 is stuck to the inner surface 14*b* of the back door 14 with a double-sided tape or an adhesive. In the case where the filter 50 is stuck to the inner surface 14*b* with a double-sided tape, it is preferable that holes defined in the double-sided tape overlap with the ventilating portion 51 so as to suppress blockage of the ventilating portion 51 by the double-sided tape. To be noted, as illustrated in FIG. 6, a center filter 50 among nine filters 50 covers more vent holes 51*a* than the other eight filters 50, and is wider in the X-axis direction than the other eight filters 50. Therefore, for the center filter 50, attachment of the center filter 50 at a wrong position (miss-assembly) can be suppressed by setting the length of the center filter 50 in the Z-axis direction to be larger than that of the other eight filters 50. That is, in the case where a plurality of filters 50 are provided and the length in a predetermined direction of part of the filters 50 is different from that of the other filters 50, miss-assembly can be reduced by making the length of the part of the filter 50 in a direction orthogonal to the predetermined direction different from that of the other filters 50. As described above, the plurality of filters 50 may include a filter 50 having a first shape and a filter 50 having a second shape different from the first shape.

Figure 8A:
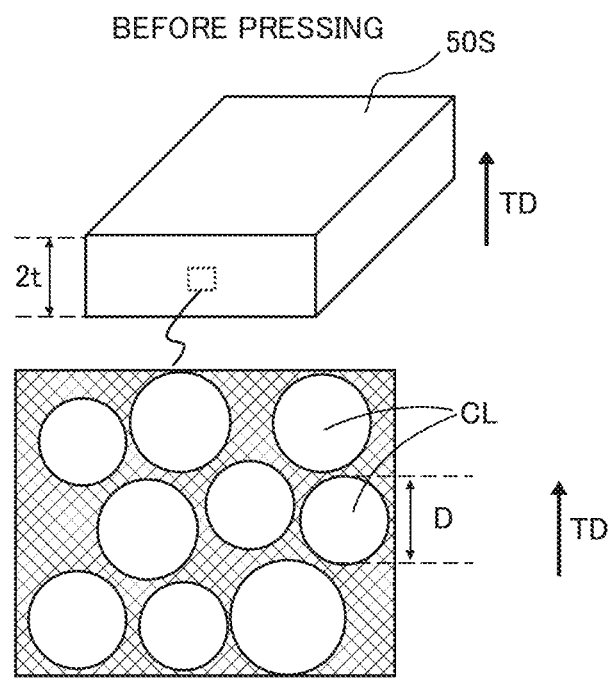
FIGS. 8A and 8B are explanatory diagrams of the filter according to the example.
Figure 8B:
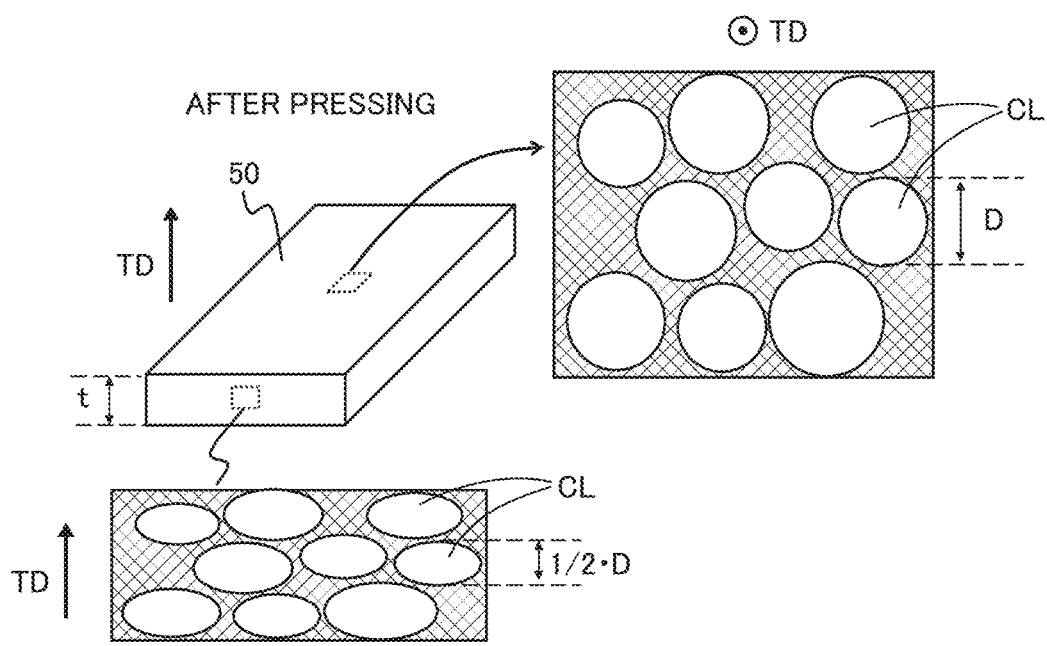

FIGS. 8A and 8B are conceptual diagrams of the filter 50 of the present example. FIG. 8A is a diagram illustrating a raw sheet 50S (moltopren SM-55) before the pressing, and FIG. 8B is a diagram illustrating the filter 50 obtained by the pressing. In FIGS. 8A and 8B, a hatched region indicates a polyurethane matrix, and solid white circles indicate cells CL (air bubbles). To be noted, although the cells CL are illustrated as circles independent from each other for the sake of description, the actual filter 50 has a continuous cell structure (open cell structure). A thickness direction TD of the filter 50 is a direction orthogonal to the surface of the filter 50 that is stuck to the inner surface 14*b* of the back door 14.

As illustrated in FIG. 8A, the raw sheet 50S of the filter 50 has a cell diameter D of 200 μm in average. That is, in the case where the diameter of each cell CL in the raw sheet 50S is defined as a cell diameter, the average value of the cell diameter is 200 μm. In addition, the thickness of the raw sheet 50S will be represented by 2t.

As illustrated in FIG. 8B, the filter 50 is formed by pressing the raw sheet 50S to halve the thickness (2t→t). By the pressing, the structure of the urethane foam shrinks in the thickness direction TD approximately evenly. Therefore, the average value of the cell diameter in the thickness direction TD of the filter 50 is 100 μm, which is a half (1/2·D) of that of the raw sheet 50S. The thickness t is 1 mm in the present example. Therefore, about 1 mm/100 μm=10 cells CL are arranged in the thickness direction TD in the filter 50. In the description below, a ratio (β/γ) of the thickness (β) of the filter 50 to the average value (γ) of the cell diameter in the thickness direction TD of the filter 50 will be referred to as "the number of cells in the thickness direction TD of the filter 50".

When the raw sheet 50S is pressed, shrinkage or expansion in a direction (hereinafter referred to as a horizontal direction) orthogonal to the thickness direction TD does not occur or is substantially negligible. Therefore, the average value of the cell diameter D in the horizontal direction of the filter 50 is 200 μm, which is the same as in the raw sheet 50S.

To be noted, the cell diameter described above is obtained as follows. The filter 50 or the raw sheet 50S is observed by using an optical microscope (VHX-5000 manufactured by Keyence). In the case of obtaining the cell diameter in the horizontal direction, the surface of the filter 50 or the raw sheet 50S is observed in the thickness direction TD as illustrated in FIG. 8B. A circle overlapping each cell is drawn by using image processing software, and the diameter of the circle (so-called equivalent circle diameter) is used as the cell diameter of that cell. Observation is performed in a field of view of 1-mm square (1 mm$^2$) at five positions, and the average value of the cell diameters of all the cells in the observed regions is used as the average value of the cell diameter in the horizontal direction of the filter 50 or the raw sheet 50S.

The cell diameter in the thickness direction TD of the raw sheet 50S is obtained by cutting the raw sheet 50S in the thickness direction TD by using a razor, and observing the cross-section. A circle overlapping each cell is drawn by using image processing software, and the diameter of the circle is used as the cell diameter of that cell. Observation is performed in a field of view of 1-mm square (1 mm$^2$) at five positions, and the average value of the cell diameters of all the cells in the observed regions is used as the average value of the cell diameter in the thickness direction TD of the raw sheet 50S.

In the case of the filter 50 obtained by pressing the raw sheet 50S, the cell diameter in the thickness direction TD of the filter 50 may be obtained by multiplying the cell diameter in the thickness direction TD of the raw sheet 50S by a press ratio. The press ratio mentioned herein is a ratio of the thickness of the filter 50 after the pressing to the thickness of the raw sheet 50S before the pressing. The press ratio in the present example is 1/2.

The relationship between the cell diameter of the filter 50 and the particle diameter of particles capable of passing through the filter 50 will be described. When the cell diameter in the horizontal direction of the filter 50 is smaller, large particles are less likely to pass through the filter 50. In addition, when the number of cells in the thickness direction TD of the filter 50 is larger, the number of cells that the particles need to pass through to pass through the filter 50 is larger, and thus large particles are less likely to pass through the filter 50.

Therefore, the maximum particle diameter of the particles capable of passing through the filter 50 can be considered to be proportional to the average value ($\alpha$) of the cell diameter in the horizontal direction of the filter 50 and inversely proportional to the number of cells ($\beta/\gamma$) in the thickness direction TD of the filter 50. That is, the maximum particle diameter of the particles capable of passing through the filter 50 can be roughly estimated by the following formula (1).

$$\text{maximum particle diameter} = \alpha/(\beta/\gamma) \quad (1)$$

In the present example, the maximum particle diameter is approximately (average value of the cell diameter in the horizontal direction of the filter 50)/(the number of cells in the thickness direction TD of the filter 50)=200 μm/10=20 μm. That is, it can be estimated that roughly particles larger than 20 μm cannot pass through the filter 50. The maximum particle diameter of the particles capable of passing through the filter 50 estimated by using the formula (1) as described above is preferably smaller than the thickness of the surface layer portion 1b of the photosensitive drum 1.

In other words, in the case of using a plastic foam such as urethane foam as the filter 50, it is preferable that $\alpha/(\beta/\gamma)<\delta$ is satisfied in the case where $\alpha$ (μm) represents the average value of the cell diameters in the plastic foam in a plane orthogonal to the thickness direction TD of the filter 50, $\beta$ (μm) represents the thickness of the filter 50, $\gamma$ (μm) represents the average value of the cell diameters in the plastic foam in the thickness direction TD of the filter 50, and $\delta$ (μm) represents the thickness from the outer peripheral surface of the base body 1a of the photosensitive drum 1 to the surface is of the photosensitive drum 1.

There is a case where an airflow flowing through a space through which the discharge port 16s and the ventilating portion 51 communicate with each other is generated by air conditioning equipment or air blowing equipment in a room in which the image forming apparatus 100 is installed. In the case where the image forming apparatus 100 is used in an environment in which a large amount of dust is present in the air and the flow of air flowing through the space through which the discharge port 16s and the ventilating portion 51 communicate with each other is strong, the dust can enter the image forming apparatus 100 together with the outside air. Further, when a scratch is formed on the photosensitive drum 1 by the dust having entered the image forming apparatus 100 and an image defect occurs, the photosensitive drum 1 needs to be replaced.

In the present example, the filters 50 for which the maximum particle diameter of the particles capable of passing through the filter 50 is smaller than the thickness $\delta$ of the surface layer portion 1b of the photosensitive drum 1 are provided on the ventilating portion 51. As a result of this, the possibility that large dust particles that can cause black dot images enter the inside of the image forming apparatus 100 and attach to the photosensitive drum 1 can be lowered.

Dustproof Performance of Filters

As described above, in the case where the maximum particle diameter of the particles capable of passing through the filter 50 is smaller than the thickness of the surface layer portion 1b of the photosensitive drum 1, the possibility of occurrence of black dot images can be lowered. The method by which the dustproof performance of the filter 50 according to the present example was inspected will be described with reference to FIGS. 9A and 9B.

Figure 9A:
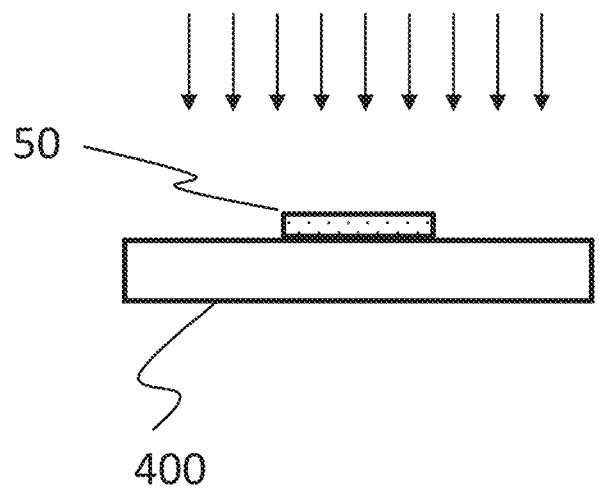
FIGS. 9A and 9B are explanatory diagrams of a dustproof performance test of the filter according to the example.

As illustrated in FIG. 9A, the filter 50 was placed on an acrylic resin flat plate 400, and 0.1 g of quartz powder Q was scattered from above. As the quartz powder Q, a 1:1 mixture of crystal powder #7 and crystal powder #8 manufactured by NAKAGAWA GOFUN ENOGU CO., LTD. was used. "#7" and "#8" are grades indicating the fineness of the particles, and a greater number indicates that the particles are finer. The particle size distribution of the quartz powder Q used for the experiment was about several tens of μm to 150 μm. That is, the quartz powder Q included both particles of particle diameters larger than the thickness of the surface layer portion 1b of the photosensitive drum 1 and particles of particle diameters equal to or smaller than the thickness of the surface layer portion 1b of the photosensitive drum 1.

Figure 9B:
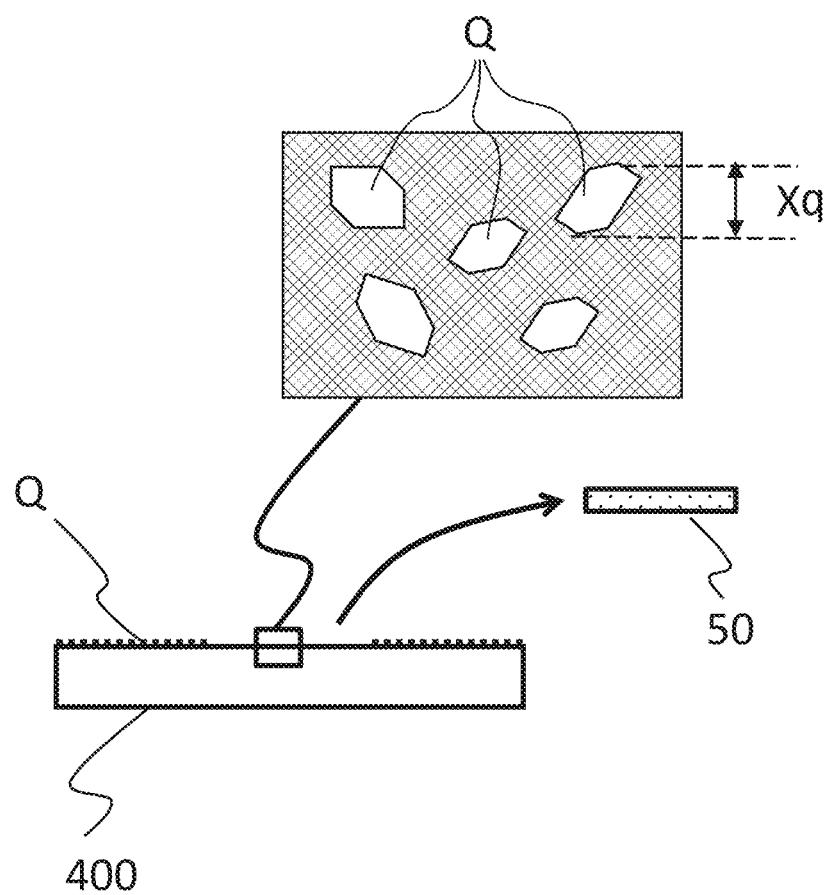

After the quartz powder Q was scattered, vibration was applied by hitting the acrylic resin flat plate 400 by a finger 20 to 30 times, and then the filter 50 was carefully removed from the acrylic resin flat plate 400. As illustrated in FIG. 9B, part of the acrylic resin flat plate 400 on which the filter 50 had been present was observed by an optical microscope, and the size of the particles having passed the filter 50 was observed. VHX-5000 manufactured by Keyence was used as the optical microscope, and observation was performed in a field of view of 1-mm square (1 mm$^2$) at five positions (that is, at an observation area of 5 mm$^2$ in total) at a magnification of 300×.

The measured equivalent circle diameters Xq (μm) of the particles were mostly smaller than 20 μm, and the maximum value thereof was about 20 μm. That is, the maximum particle diameter (about 20 μm) of the quartz powder Q that passed through the filter 50 of the present example was sufficiently smaller than the thickness of the surface layer portion 1b of the photosensitive drum 1. In addition, the result that the maximum particle diameter was about 20 μm matches the estimation result obtained by using the formula (1) described above.

In the present disclosure, the "maximum particle diameter of the particles capable of passing through the filter" represents the maximum value of the equivalent circle diameter Xq of the quartz powder Q observed in the observation area of 5 mm$^2$ in total by the inspection method described above.

To be noted, although subjecting all the particles having passed through the filter to a particle size distribution meter can be considered, there is a possibility that the size of a foreign matter different from the intended measurement target (particles having passed through the filter) is erroneously detected as the maximum particle diameter in the process of preparation and measurement of the measurement sample. Examples of the foreign matter include debris different from the quartz powder Q, and air bubbles in the case of using a particle size distribution meter of a wet system. Therefore, in the present disclosure, the maximum particle diameter is defined as described above.

The method and result of a test conducted on the image forming apparatus 100 described above for evaluating the water droplet resistance and the dust resistance will be described.

Water Droplet Resistance Test

As an acceleration test for evaluating the water droplet resistance of the image forming apparatus 100, sheets left to stand for 48 hours in an environment of a room temperature of 32.5° C. and a humidity of 80% were set in the feeding portion 6, duplex printing was performed on ten of the sheets, and whether a water droplet mark could be observed on the image was checked. To be noted, this test was started after the internal temperature of the image forming apparatus 100 became substantially equal to the room temperature after the elapse of sufficient time since the previous image forming operation was finished. This is because condensation is more likely to occur after the internal temperature has returned to the room temperature than in a state in which the inside of the image forming apparatus 100 is hot. The sheets used for the test were CS-680 manufactured by Canon Inc. A halftone image of an image coverage of 25% was formed on the entirety of the effective printing region of each surface of each sheet.

In the process of the duplex printing, when water droplets are accumulated somewhere in the duplex conveyance path CP2, a sheet passing through the duplex conveyance path CP2 comes into contact with the water droplet and gets wet. Then, when transferring an image from the photosensitive drum 1 onto the second surface of the sheet, moisture adsorbs onto a surface region of the photosensitive drum 1 having come into contact with the wet part of the sheet. The surface region of the photosensitive drum 1 onto which moisture has adsorbed is more strongly electrified by the charging portion than the region therearound. In the surface region electrified strongly by the charging portion, the density of the toner image formed through the steps of exposure and development is lower than in the region therearound. As a result, in the halftone image transferred onto the sheet, an image defect (referred to as a water droplet mark or a white dot image) in which a white spot appears in a position in the image corresponding to the surface region of the photosensitive drum 1 having come into contact with the wet part of the sheet occurs.

Figure 10:
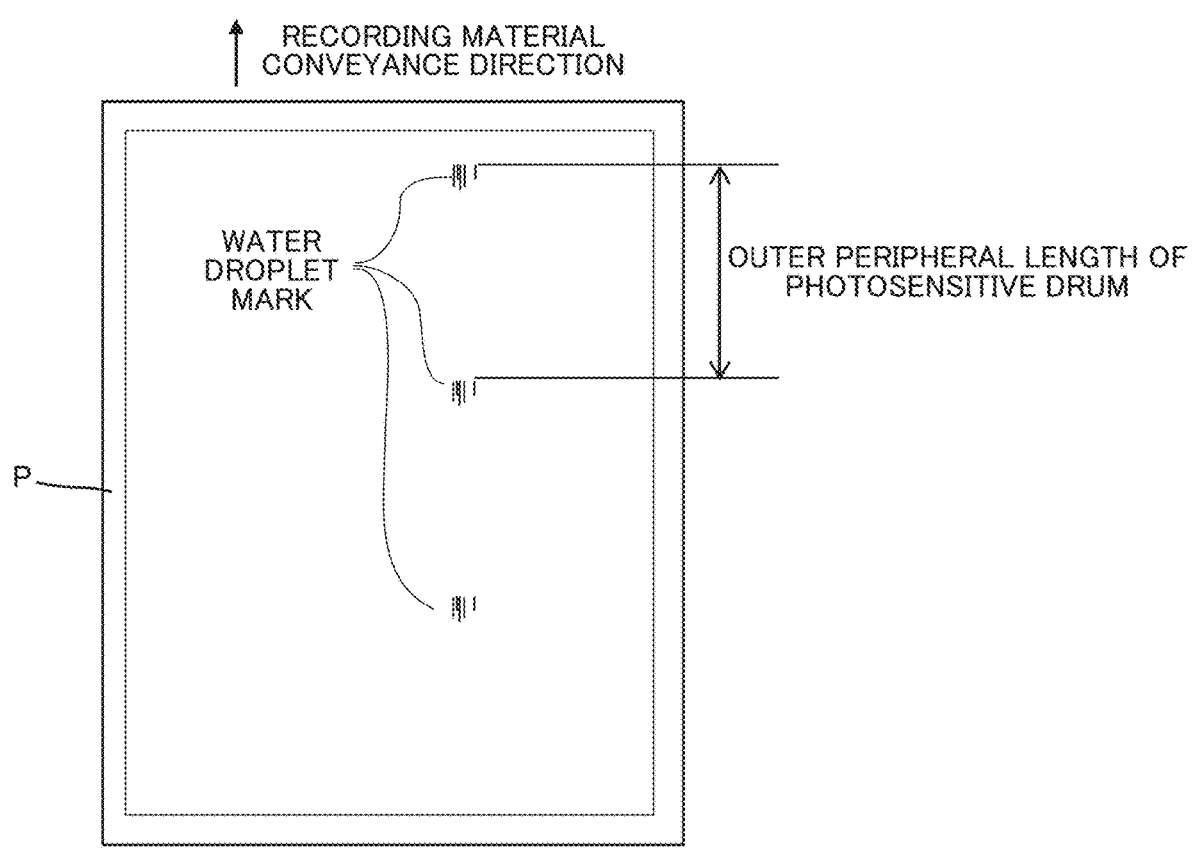
FIG. 10 is a diagram illustrating a water droplet mark.

FIG. 10 illustrates an example of the water droplet mark. The water droplet mark is an image defect periodically appearing at a pitch corresponding to the outer peripheral length of the photosensitive drum 1. If the water vapor generated in the fixing portion 9 is efficiently discharged to the outside of the image forming apparatus 100, the water droplet mark is less likely to occur.

Dust Resistance Test

Figure 11:
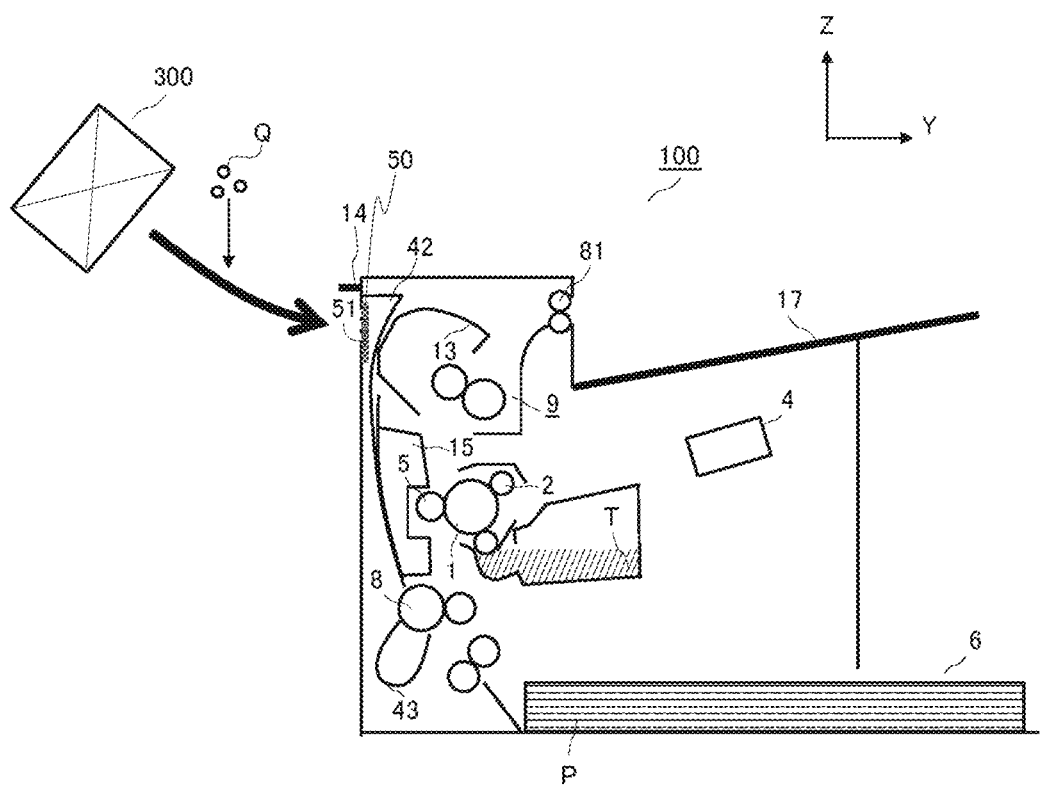
FIG. 11 is an explanatory diagram of a dust resistance evaluation test of the image forming apparatus according to the example.

The method of the dust resistance test will be described. First, as illustrated in FIG. 11, the quartz powder Q serving as dust was supplied while blowing wind from the rear side (−Y side) of the image forming apparatus 100 by a fan 300. The wind speed was set such that wind of a wind speed of 1 m/sec was blown on the outer surface 14a of the back door 14 at the position of the ventilating portion 51. A particle mixture of crystal powders #7 and #8 manufactured by NAKAGAWA GOFUN ENOGU CO., LTD. was used as the quartz powder Q. 1 g of the quartz powder Q was placed on weighing paper, and was supplied little by little over 30 seconds. Then, the image forming apparatus 100 was moved to an environment of a room temperature of 32.5° C. and a humidity of 80%, and an endurance test was started. In the endurance test, 10,000 sheets of A4 paper were passed through. Then, the number of streaks of black dot images appearing in the output sheets was checked. The results are shown in Table 1.

TABLE 1

|  | Maximum particle diameter Xmax (μm) | Dust resistance (Number of streaks of black dot images) | Water droplet resistance (Number of sheets with water droplet mark) |
| --- | --- | --- | --- |
| Example 1 | 20 | 0 | 2 |
| Example 2 | 20 | 0 | 2 |
| Example 3 | 40 | 0 | 2 |
| Comparative Example 1 | — | 8 | 2 |
| Comparative Example 2 | — | 0 | 6 |
| Comparative Example 3 | 110 | 5 | 2 |

In Example 1, although a minor water droplet mark was observed on the second surface of two sheets among the ten sheets, no water droplet mark was observed on the other sheets. This indicates a water droplet resistance sufficient for practical use. That is, according to the present example, even in the case where the filters 50 are provided on the ventilating portion 51, the function of the ventilating portion 51 of discharging the heat and water vapor generated in the fixing portion 9 to the outside of the image forming apparatus 100 can be maintained. That is, by providing the filters 50 on the ventilating portion 51, the entrance of dust into the image forming apparatus 100 through the discharge port 16s and the ventilating portion 51 can be suppressed while maintaining the function of the ventilating portion 51 of discharging the heat and water vapor to the outside of the image forming apparatus 100.

In addition, in Example 1, no black dot image was observed in the dust resistance test. In the present example, the maximum particle diameter of the particles capable of passing through the filter 50 is about 20 μm, which is smaller than the thickness of the surface layer portion 1b of the photosensitive drum 1. Therefore, by providing the filters 50 on the ventilating portion 51, entrance of the quartz powder Q having a particle diameter larger than the thickness of the surface layer portion 1b of the photosensitive drum 1 into the image forming apparatus 100 through the ventilating portion 51 can be suppressed. It can be considered that the occurrence of black dot images caused by large quartz powder Q was suppressed as a result of this.

Comparative Example 1

As Comparative Example 1, an image forming apparatus in which the filters 50 were not provided on the ventilating portion 51 was prepared. The image forming apparatus of Comparative Example 1 has the same configuration as the image forming apparatus 100 of Example 1 except that the filters 50 are not provided.

As shown in Table 1, in Comparative Example 1, a result equivalent to that of Example 1 was obtained for the water droplet resistance, but in the dust resistance test, eight streaks of black dot images were observed. In Comparative Example 1, since the filters 50 are not provided on the ventilating portion 51, quartz powder Q having a particle diameter larger than the thickness of the surface layer portion 1b of the photosensitive drum 1 can enter the inside of the image forming apparatus 100 through the ventilating portion 51. It can be considered that black dot images caused by large quartz powder Q appeared as a result of this.

Comparative Example 2

As Comparative Example 2, an image forming apparatus in which the ventilating portion 51 was blocked by a tape was prepared. The image forming apparatus of Comparative Example 2 has the same configuration as the image forming apparatus 100 of Example 1 except that the ventilating portion 51 is blocked by a tape. A heat-resistant polyimide tape manufactured by 3M was used as the tape.

As shown in Table 1, in Comparative Example 2, an obvious water droplet mark was observed on the second surface of six sheets in the ten sheets in the water droplet resistance test. In contrast, in the dust resistance test, no black dot image was observed. It can be considered that the reason why the water droplet resistance was inferior to that of Example 1 was that as a result of the ventilating portion 51 being blocked by a tape, water vapor generated in the fixing portion 9 is accumulated in the image forming apparatus, and thus a lot of condensation occurred in the duplex conveyance path CP2. In contrast, it can be considered that as a result of the ventilating portion 51 being blocked by a tape, entrance of the quartz powder Q through the ventilating portion 51 was suppressed approximately completely, and therefore the black dot images caused by the quartz powder Q did not appear.

Comparative Example 3

As Comparative Example 3, an image forming apparatus in which a urethane foam (moltopren) that was not pressed and had a thickness of 1 mm was used as the filter 50 was prepared. The image forming apparatus of Comparative Example 3 has the same configuration as the image forming apparatus 100 of Example 1 except for the filters 50.

As a result of conducting the dustproof performance test (FIGS. 9A and 9B) described above for the filter 50 used for Comparative Example 3, a particle of a particle diameter of 110 μm maximum passed through the filter 50. That is, in Comparative Example 3, the maximum particle diameter of the particles capable of passing through the filter 50 was larger than the thickness of the surface layer portion 1b of the photosensitive drum 1.

The cell diameter of moltopren used for Comparative Example 3 was 300 μm. Therefore, the number of cells in the thickness direction TD of the filter 50 was 1 mm/300 μm=3.3. Further, an estimated value of the maximum particle diameter of the particles capable of passing through the filter 50 obtained by using the formula (1) described above was (cell diameter in the horizontal direction of the filter 50)/(number of cells in the thickness direction TD of the filter 50)=300 μm/3.3≈100 μm. This estimated value is close to the result (110 μm) of the dustproof performance test.

As shown in Table 1, in Comparative Example 3, a result equivalent to that of example 1 was obtained for the water droplet resistance. It can be considered that there was no problem in the breathability and moisture permeability of the filter 50 of Comparative Example 3. In contrast, in the dust resistance test, five streaks of black dot images were observed. In Comparative Example 3, although the filters 50 are provided on the ventilating portion 51, the dustproof performance is inferior to that of Example 1, and therefore large quartz powder Q is more likely to enter the inside of the image forming apparatus 100 than in the case of the filter 50 of Example 1. It can be considered that as a result of this, quartz powder Q having a particle diameter larger than the thickness of the surface layer portion 1b of the photosensitive drum 1 entered the inside of the image forming apparatus 100 through the ventilating portion 51, and thus black dot images caused by large quartz powder Q appeared.

Example 2

As Example 2, an image forming apparatus in which a urethane foam (moltopren) that was not pressed and had a thickness of 2 mm was used as the filter 50 was prepared. The image forming apparatus of Example 2 has the same configuration as the image forming apparatus 100 of Example 1 except for the filters 50.

As a result of conducting the dustproof performance test described above for the filter 50 used for Example 2, a particle of a particle diameter of 20 μm maximum passed through the filter 50. That is, the dustproof performance of the filter 50 of Example 2 was equivalent to that of the filter 50 of Example 1.

The cell diameter of moltopren used for Example 2 was 200 μm. Therefore, the number of cells in the thickness direction TD of the filter 50 was 2 mm/200 μm=10. Further, an estimated value of the maximum particle diameter of the particles capable of passing through the filter 50 obtained by using the formula (1) described above was (cell diameter in the horizontal direction of the filter 50)/(number of cells in the thickness direction TD of the filter 50)=200 μm/10≈20 μm. This estimated value is close to the result (20 μm) of the dustproof performance test.

As shown in Table 1, in Example 2, a result equivalent to that of Example 1 was obtained for both the water droplet resistance and the dust resistance. That is, the filter 50 of Example 2 had good breathability and moisture permeability, and suppressed entrance of large quartz powder Q into the image forming apparatus 100 through the ventilating portion 51. In other words, whether or not the filter 50 was pressed did not directly affect the performance regarding water droplet resistance and dust resistance.

Example 3

As Example 3, an image forming apparatus in which a plain-woven mesh formed from stainless steel was used as the filter 50 was prepared. The image forming apparatus of Example 3 has the same configuration as the image forming apparatus 100 of Example 1 except for the filters 50.

The fineness of the mesh was 200 mesh, the wire thickness was 50 μm, and the sieve opening (interval between wires) was 77 μm. As a result of conducting the dustproof performance test, the maximum particle diameter of the particles capable of passing through the filter 50 of Example 3 was about 40 μm. This is smaller than the thickness of the surface layer portion 1b of the photosensitive drum 1. The maximum particle diameter is smaller than the sieve opening of the mesh because it is also difficult for particles slightly smaller than the sieve opening to pass through the gap because the particles bump into each other to get caught by the mesh or attach to the wire when passing through the mesh.

As shown in Table 1, in Example 3, a result equivalent with that of Example 1 was obtained for both the water droplet resistance and the dust resistance. That is, the mesh filter 50 of Example 3 had good breathability and moisture permeability, and suppressed entrance of large quartz powder Q into the image forming apparatus 100 through the ventilating portion 51.

Summary

As described above, in the case where the filter 50 for which the maximum particle diameter of particles capable of passing through the filter 50 was smaller than the thickness of the surface layer portion 1*b* of the photosensitive drum 1 was used in the dustproof performance test, good results were obtained for the dust resistance. That is, it can be seen that troubles caused by dust can be suppressed by employing the configuration in which the maximum particle diameter of the particles capable of passing through the filter 50 is smaller than the thickness of the surface layer portion of the photosensitive member.

In addition, good results were obtained for the water droplet resistance in configurations other than Comparative Example 2 in which the ventilating portion 51 was blocked by a tape. Therefore, it can be seen that, by using the filter 50 for which the maximum particle diameter of particles capable of passing through the filter 50 is smaller than the thickness of the surface layer portion 1*b* of the photosensitive drum 1 and disposing the filter 50 on the ventilating portion 51, image defects caused by dust can be suppressed while suppressing occurrence of condensation.

To be noted, although no difference is observed between Examples 1 and 2 in terms of water droplet resistance and dust resistance, the filter 50 of Example 1 is thinner than the filter 50 of Example 2. Therefore, the filter 50 of Example 1 is advantageous in that the filter 50 is less likely to come into contact with the recording material P conveyed in the conveyance path CP (duplex conveyance path CP2) and more stable recording material conveyance can be realized. To be noted, whether or not to perform the pressing may be selected in consideration of how easily the filter 50 can be stuck, the cost of the pressing, and the like.

Modification Example

The material of the filter 50 is not limited to the urethane foam and the plain-woven mesh formed from stainless steel that have been described in the examples. The material of the filter 50 may be selected from foam sponge materials formed from ester or ether urethane materials other than moltopren, olefin sponge materials, melamine sponge materials, and other foam sponge materials. That is, the material of the filter 50 may be a plastic foam (synthetic resin foam) of an open cell type. In addition, the material of the filter 50 may be an unwoven fabric formed from fiber of cotton, polyether sulfone (PES), polyethylene terephthalate (PET), glass, or the like. In addition, the material of the filter 50 may be filter paper (paper filter), or a metal mesh having a honeycomb structure. Regardless of the material of the filter 50, an advantage similar to that of the examples described above can be obtained by using the filter 50 for which the maximum particle diameter of particles capable of passing through the filter 50 is smaller than the thickness of the surface layer portion 1*b* of the photosensitive drum 1.

In addition, the ventilating portion 51 in the examples described above is an example of an opening portion that the housing 101 of the image forming apparatus 100 has. The position of the opening portion (ventilating portion 51), and the shape, size, number, and arrangement of the openings (vent holes 51*a*) in the opening portion may be appropriately changed in accordance with the specific configuration of the image forming apparatus 100. For example, the vent hole 51*a* may be a narrow elongated hole extending in the X-axis direction (width direction of the recording material P) over a range including the effective printing region of the recording material of the maximum size.

In addition, although the filters 50 are stuck on the inner surface 14*b* that is a surface of the back door 14 on the inside of the housing 101 in the examples described above, the filters 50 may be stuck on the outer surface 14*a* of the back door 14. Also in this case, entrance of dust into the image forming apparatus 100 through the ventilating portion 51 can be suppressed by the filters 50.

In addition, although image defects (black dot images) caused by scratches on the surface layer portion 1*b* of the photosensitive drum 1 have been described as an example of troubles caused by dust particles having entered the inside of the image forming apparatus 100, the dust particles can cause other troubles.

For example, in the case where the image forming apparatus 100 includes the fixing portion 9 of a film heating system using a tubular film (fixing film 112) as a heating member (fixing member), there is a possibility that the dust forms a scratch on the fixing film 112. That is, when dust particles having a large particle diameter reach the fixing portion 9, a scratch can be formed on the fixing film 112.

Therefore, the filter 50 for which the maximum particle diameter of particles capable of passing through the filter 50 is smaller than the thickness of the fixing film 112 is preferably used. In Example 1 described above, the thickness of the fixing film 112 is at least 70 μm (thickness of base layer+thickness of releasing layer=60 μm+10 μm), and therefore the filter 50 described in Examples 1 to 3 can be suitably used. As a result of this, the possibility of dust having a large particle diameter scratching the fixing film 112 can be lowered.

In addition, in the case of using a plastic foam such as urethane foam as the filter 50, it is preferable that a relationship of $\alpha/(\beta/\gamma)<\delta$ where $\delta$ (μm) represents the thickness of the fixing film 112, is satisfied in accordance with the definition of $\alpha$, μ, and $\gamma$ described above. As a result of this, the possibility of the tear of the fixing film 112 being accelerated by dust having a large particle diameter can be lowered.

As another trouble caused by dust particles, there is a case where the dust causes an image defect in an image forming apparatus including an intermediate transfer belt. The image forming apparatus including an intermediate transfer belt is an image forming apparatus of a system (intermediate transfer system) that forms an image on a recording material P by transferring a toner image from the photosensitive drum 1 onto the intermediate transfer belt through primary transfer and transferring the toner image from the intermediate transfer belt onto the recording material P through secondary transfer at a secondary transfer portion.

The intermediate transfer belt includes a base layer in charge of mechanical strength, and a surface layer serving as a toner image bearing surface. An elastic layer may be provided between the base layer and the surface layer.

When dust particles enter the inside of the image forming apparatus including the intermediate transfer belt, there is a possibility that the dust particles are pressed strongly against the intermediate transfer belt at a contact portion between the intermediate transfer belt and another member and the dust particles form a scratch penetrating the surface layer of the intermediate transfer belt. For example, the "other member" is a cleaning blade in pressure contact with the surface (outer peripheral surface) of the intermediate transfer belt to remove, from the intermediate transfer belt, transfer residual toner not transferred onto the recording material P at the secondary transfer portion. When a scratch is formed on the surface layer of the intermediate transfer belt, the surface of the intermediate transfer belt can become uneven, thus the toner image formed on the surface thereof can be disturbed or the efficiency of the primary transfer and the secondary transfer can be lowered, which can cause an image defect.

Therefore, the filter 50 for which the maximum particle diameter of particles capable of passing through the filter 50 is smaller than the thickness of the surface layer of the intermediate transfer belt is preferably used. As a result of this, occurrence of an image defect caused by a scratch on the surface layer of the intermediate transfer belt formed by dust having a large particle diameter can be suppressed.

In addition, in the case of using a plastic foam such as urethane foam as the filter 50, it is preferable that a relationship of $\alpha/(\beta/\gamma)<\delta$, where $\delta$ (μm) represents the thickness of the surface layer of the intermediate transfer belt, is satisfied in accordance with the definition of $\alpha$, $\beta$, and $\gamma$ described above. As a result of this, the possibility of the occurrence of an image defect caused by a scratch on the surface layer of the intermediate transfer belt formed by dust having a large particle diameter can be suppressed.

In the examples described above, a space inside the housing 101 communicating with the ventilating portion 51 has a function as a conveyance path for the recording material P However, in the case of applying the technique of the present disclosure to an image forming apparatus, the space inside the housing 101 communicating with the ventilating portion 51 does not need to have a function as a conveyance path.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149817, filed on Sep. 15, 2023, which is hereby incorporated by reference herein in its entirety.

What is claimed is:

1. An image forming apparatus comprising:
an image forming portion including a photosensitive member and configured to form a toner image on a recording material by using the photosensitive member;
a fixing portion configured to form a nip portion to nip the recording material, and configured to fix the toner image to the recording material by heating the toner image while conveying the recording material with the nip portion;
a housing configured to accommodate the image forming portion and the fixing portion and having an opening portion through which an outside of the housing and an inside of the housing communicate with each other, the opening portion being positioned above the nip portion in a vertical direction; and
a filter covering the opening portion,
wherein the photosensitive member includes a conductive base body and a surface layer portion formed on an outer periphery of the base body,
wherein in a case where a thickness of the surface layer portion is a distance from an outer peripheral surface of the base body to a surface of the photosensitive member, a maximum particle diameter of particles capable of passing through the filter is smaller than the thickness of the surface layer portion, and
wherein the filter is formed from a plastic foam of an open cell type.

2. The image forming apparatus according to claim 1, wherein $\alpha/(\beta/\gamma)<\delta$ is satisfied in a case where $\alpha$ (μm) represents an average value of cell diameters of the plastic foam in a plane orthogonal to a thickness direction of the filter, $\beta$ (μm) represents a thickness of the filter, $\gamma$ (μm) represents an average value of cell diameters of the plastic foam in the thickness direction of the filter, and $\delta$ (μm) represents the thickness of the surface layer portion.

3. The image forming apparatus according to claim 1, wherein the surface layer portion includes a photosensitive layer and an intermediate layer, the photosensitive layer being configured to generate electrical charges in response to light irradiation and attenuate a potential of the surface of the photosensitive member, the intermediate layer being provided between the base body and the photosensitive layer and restrict charge injection from the base body to the photosensitive layer.

4. The image forming apparatus according to claim 1, wherein the housing includes an exterior member and an opposing portion, the exterior member including an outer surface forming an exterior surface of the housing and an inner surface provided on an opposite side to the outer surface, the opposing portion opposing the inner surface with a gap therebetween, and
wherein the opening portion is provided in the exterior member, and a space continuous with the gap and the outside of the housing communicate with each other through the opening portion.

5. The image forming apparatus according to claim 4, wherein the filter is attached to the inner surface of the exterior member.

6. The image forming apparatus according to claim 5, wherein the exterior member includes a rib shape protruding in a direction toward the opposing portion from the inner surface,
wherein the filter is attached to the inner surface at a position different from the rib shape, and
wherein at each position in a range where the filter is provided in the vertical direction, a thickness of the filter is smaller than a protruding amount of the rib shape with respect to the inner surface.

7. An image forming apparatus comprising:
an image forming portion configured to form a toner image on a recording material;
a fixing portion including a tubular film and a heating portion configured to heat the film, configured to form a nip portion to nip the recording material, and configured to fix the toner image to the recording material by heating the toner image with the film;
a housing configured to accommodate the image forming portion and the fixing portion and having an opening portion through which an outside of the housing and an inside of the housing communicate with each other, the opening portion being positioned above the nip portion in a vertical direction; and
a filter covering the opening portion,
wherein a maximum particle diameter of particles capable of passing through the filter is smaller than a thickness of the film, and
wherein the filter is formed from a plastic foam of an open cell type.

8. An image forming apparatus comprising:
an image forming portion including a photosensitive member and configured to form a toner image on a recording material by using the photosensitive member;
a fixing portion configured to form a nip portion to nip the recording material, and configured to fix the toner image to the recording material by heating the toner image while conveying the recording material with the nip portion;
a housing configured to accommodate the image forming portion and the fixing portion and having an opening portion through which an outside of the housing and an inside of the housing communicate with each other, the opening portion being positioned above the nip portion in a vertical direction; and
a filter covering the opening portion,
wherein the photosensitive member includes a conductive base body and a surface layer portion formed on an outer periphery of the base body, and
wherein the filter is formed from a plastic foam of an open cell type, and
wherein $\alpha/(\beta/\gamma)<0$ is satisfied in a case where $\alpha$ (μm) represents an average value of cell diameters of the plastic foam in a plane orthogonal to a thickness direction of the filter, $\beta$ (μm) represents a thickness of the filter, $\gamma$ (μm) represents an average value of cell diameters of the plastic foam in the thickness direction of the filter, and $\delta$ (μm) represents a distance from an outer peripheral surface of the base body to a surface of the photosensitive member.

9. The image forming apparatus according to claim 8, wherein the surface layer portion includes a photosensitive layer and an intermediate layer, the photosensitive layer being configured to generate electrical charges in response to light irradiation and attenuate a potential of the surface of the photosensitive member, the intermediate layer being provided between the base body and the photosensitive layer and restrict charge injection from the base body to the photosensitive layer.

10. The image forming apparatus according to claim 8, wherein the housing includes an exterior member and an opposing portion, the exterior member including an outer surface forming an exterior surface of the housing and an inner surface provided on an opposite side to the outer surface, the opposing portion opposing the inner surface with a gap therebetween, and
wherein the opening portion is provided in the exterior member, and a space continuous with the gap and the outside of the housing communicate with each other through the opening portion.

11. The image forming apparatus according to claim 10, wherein the filter is attached to the inner surface of the exterior member.

12. The image forming apparatus according to claim 11, wherein the exterior member includes a rib shape protruding in a direction toward the opposing portion from the inner surface,
wherein the filter is attached to the inner surface at a position different from the rib shape, and
wherein at each position in a range where the filter is provided in the vertical direction, a thickness of the filter is smaller than a protruding amount of the rib shape with respect to the inner surface.

13. An image forming apparatus comprising:
an image forming portion including a photosensitive member and configured to form a toner image on a recording material by using the photosensitive member;
a fixing portion configured to form a nip portion to nip the recording material, and configured to fix the toner image to the recording material by heating the toner image while conveying the recording material with the nip portion;
a housing configured to accommodate the image forming portion and the fixing portion and having an opening portion through which an outside of the housing and an inside of the housing communicate with each other, the opening portion being positioned above the nip portion in a vertical direction; and
a filter covering the opening portion,
wherein the photosensitive member includes a conductive base body and a surface layer portion formed on an outer periphery of the base body,
wherein in a case where a thickness of the surface layer portion is a distance from an outer peripheral surface of the base body to a surface of the photosensitive member, a maximum particle diameter of particles capable of passing through the filter is smaller than the thickness of the surface layer portion,
wherein the housing includes an exterior member and an opposing portion, the exterior member including an outer surface forming an exterior surface of the housing and an inner surface provided on an opposite side to the outer surface, the opposing portion opposing the inner surface with a gap therebetween, and
wherein the opening portion is provided in the exterior member, and a space continuous with the gap and the outside of the housing communicate with each other through the opening portion.

14. The image forming apparatus according to claim 13, wherein the surface layer portion includes a photosensitive layer and an intermediate layer, the photosensitive layer being configured to generate electrical charges in response to light irradiation and attenuate a potential of the surface of the photosensitive member, the intermediate layer being provided between the base body and the photosensitive layer and restrict charge injection from the base body to the photosensitive layer.

15. The image forming apparatus according to claim 13, wherein the filter is attached to the inner surface of the exterior member.

16. The image forming apparatus according to claim 15, wherein the exterior member includes a rib shape protruding in a direction toward the opposing portion from the inner surface,
wherein the filter is attached to the inner surface at a position different from the rib shape, and
wherein at each position in a range where the filter is provided in the vertical direction, a thickness of the filter is smaller than a protruding amount of the rib shape with respect to the inner surface.

\* \* \* \* \*